(12) United States Patent
Meis et al.

(10) Patent No.: US 11,053,011 B2
(45) Date of Patent: Jul. 6, 2021

(54) ICE DETECTION SYSTEMS FOR AIRCRAFT AND RELATED METHODS

(71) Applicant: The Boeing Company, Chicago, IL (US)

(72) Inventors: Charles Steven Meis, Renton, WA (US); Jon Meis, Seattle, WA (US); Rachel Malia Darr, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 231 days.

(21) Appl. No.: 16/125,342

(22) Filed: Sep. 7, 2018

(65) Prior Publication Data
US 2020/0079511 A1    Mar. 12, 2020

(51) Int. Cl.
*B64D 15/22* (2006.01)
*B64D 15/12* (2006.01)
*G01K 11/12* (2021.01)
*G01N 31/22* (2006.01)

(52) U.S. Cl.
CPC ............ *B64D 15/22* (2013.01); *B64D 15/12* (2013.01); *G01K 11/12* (2013.01); *G01N 31/222* (2013.01)

(58) Field of Classification Search
CPC ........ B64D 15/22; B64D 15/12; B64D 15/20; G01K 11/12; G01N 31/222
See application file for complete search history.

(56) References Cited

U.S. PATENT DOCUMENTS

| 6,592,255 B1 * | 7/2003 | Duroux ............... B60R 1/12 374/109 |
| 2010/0012017 A1 * | 1/2010 | Miller .................. G01J 1/429 116/201 |
| 2016/0023455 A1 * | 1/2016 | Miller .................. G01K 11/12 101/202 |

FOREIGN PATENT DOCUMENTS

| EP | 2029428 | 3/2009 |
| GB | 2555783 | 5/2018 |
| WO | 2007138450 | 12/2007 |

OTHER PUBLICATIONS

European Patent Office, "Extended European Search Report," issued in connection with European Patent Application No. 19195795.0, dated Jan. 31, 2020, 9 pages.

* cited by examiner

*Primary Examiner* — Valentina Xavier
(74) *Attorney, Agent, or Firm* — Hanley, Flight & Zimmerman, LLC

(57) ABSTRACT

Ice detection systems for aircraft and related methods are disclosed. A disclosed example ice detection system includes a thermochromic device to sense a temperature of freestream air relative to a temperature threshold, and a hydrochromic device to sense an amount of moisture in the freestream air relative to a moisture threshold. A controller to detect an icing condition in response to the thermochromic device sensing a temperature that is less than or equal to the temperature threshold and the hydrochromic device sensing an amount moisture that exceeds the moisture threshold.

20 Claims, 16 Drawing Sheets

ICE DETECTION SYSTEMS FOR AIRCRAFT AND RELATED METHODS

FIELD OF THE DISCLOSURE

This disclosure relates generally to aircraft and, more particularly, to ice detection systems for aircraft and related methods.

BACKGROUND

Accumulation of ice on critical surfaces of aircraft can affect aircraft flight performance. For example, ice accumulation on a leading edge of an aircraft wing can have significant impact on lift and/or drag performance characteristic(s). To detect ice accumulation, some known aircraft employ ice accretion sensors that include a sensor probe configured to collect supercooled water droplets on a surface of the sensor probe. However, such sensor probes are typically installed on a forward fuselage section of the aircraft, which is typically positioned at a distance from critical airfoil surfaces that are susceptible to icing. During operation, ice can accumulate on the critical airfoil surfaces prior to accumulating on the sensor probes. As a result, the aircraft anti-icing system cannot be activated in a timely manner.

SUMMARY

An example ice detection system includes a thermochromic device to sense a temperature of freestream air relative to a temperature threshold, and a hydrochromic device to sense an amount of moisture in the freestream air relative to a moisture threshold. A controller is to detect an icing condition in response to the thermochromic device sensing a temperature being less than or equal to the temperature threshold and the hydrochromic device sensing an amount of moisture that exceeds the moisture threshold.

An example method for detecting an icing condition includes identifying a first color or a second color of a thermochromic device, the first color corresponding to an air temperature being greater than a temperature threshold and the second color corresponding to the air temperature being less than or equal to the temperature threshold; identifying a third color or a fourth color of a hydrochromic device, the third color corresponding to an amount of moisture not exceeding a moisture threshold and the fourth color corresponding to an amount of moisture exceeding the moisture threshold; and determining an icing condition in response to identifying the second color and the fourth color.

An example tangible, computer-readable medium comprising instructions that, when executed, cause a machine to: identify a first color or a second color of a thermochromic device, the first color corresponding to an air temperature being greater than a temperature threshold and the second color corresponding to the air temperature being less than or equal to the temperature threshold; identify a third color or a fourth color of a hydrochromic device, the third color corresponding to an amount of moisture not exceeding a moisture threshold and the fourth color corresponding to an amount of moisture exceeding the moisture threshold; and determine an icing condition in response to identifying the second color and the fourth color.

Certain examples are shown in the above-identified figures and described in detail below. In describing these examples, like or identical reference numbers are used to identify the same or similar elements. The figures are not necessarily to scale and certain features and certain views of the figures can be shown exaggerated in scale or in schematic for clarity and/or conciseness. Additionally, several examples have been described throughout this specification. Any features from any example can be included with, a replacement for, or otherwise combined with other features from other examples. In other words, the example disclosed herein are not mutually exclusive to each other. As used in this patent, stating that any part is in any way positioned on (e.g., located on, disposed on, formed on, coupled to, etc.) another part, means that the referenced part is either in contact with the other part, or that the referenced part is spaced from the other part with one or more intermediate part(s) located therebetween. Stating that any part is in contact with another part means that there is no intermediate part between the two parts.

DETAILED DESCRIPTION

Ice detection systems vary between different aircraft. Some aircraft (e.g., commercial transport-category aircraft) utilize ice detection sensors capable of detecting aircraft icing conditions and alerting the flight crew of such conditions. Many known aircraft employ ice accretion sensors that include a sensor probe designed to collect supercooled water droplets on a surface of the probe. However, such ice accretion sensor probes are typically located away from (e.g., are not installed in an immediate vicinity of) critical surfaces (e.g., airfoil surfaces) that are susceptible to icing. For example, such ice accretion sensors are typically installed on a forward fuselage section of the aircraft.

Figure 15:
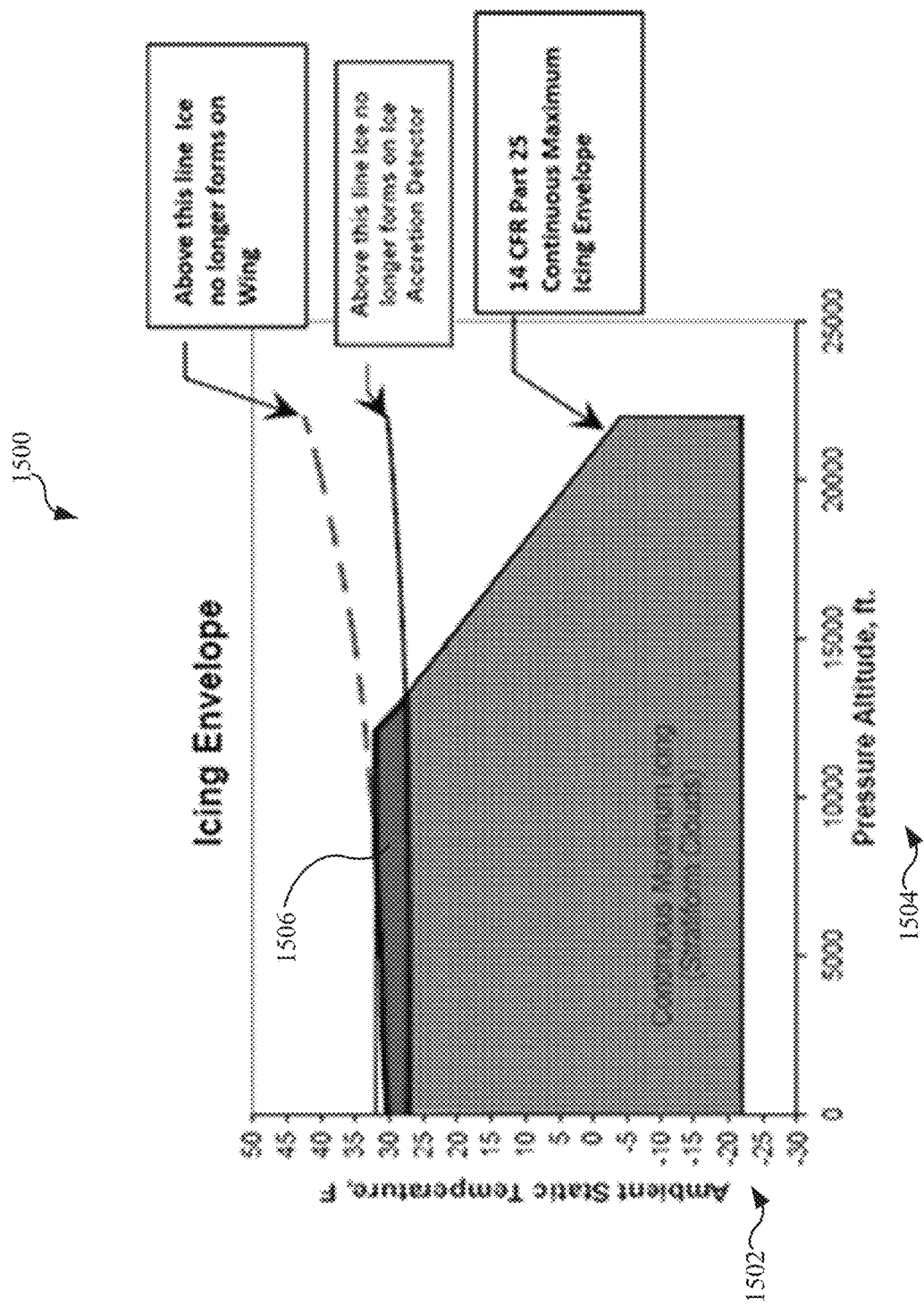
FIG. 15 is an example graph illustrating an example ice detection envelope.

The ice accretion sensors are designed to accumulate and detect ice accretion at essentially the same time that ice accumulates on a wing, an engine inlet, a leading edge surface, and/or other critical surfaces of the aircraft. However, when flying at ambient temperatures near freezing (e.g., temperatures between approximately 27° F. and 35° F.), ice can form on a leading edge of a wing prior to forming on a probe of the ice accretion sensor. Therefore, some ice detection systems cannot promptly identify accumulation of ice or ice conditions, resulting in delayed activation of anti-icing systems. The temperature regions that results in such delayed activation is typically referred to as a zone of non-detection (hereinafter "ZND"). Graph 1 shown in FIG. 15 is a continuous maximum icing envelope 1500 published by the Federal Aviation Administration (FAA) of the United States of America in Appendix C of section 14 of the Code of Federal Regulations part 25. (14 CFR part 25). Graph 1 illustrates example icing conditions associated with an example ZND (e.g., where ice can form on a wing leading edge prior to ice forming on a probe of an ice accretion sensor). The icing envelope 1500 illustrated below includes ambient static temperature range 1502 (in degrees Fahrenheit) on the vertical axis (e.g., the y-axis) verses pressure altitude 1504 (in feet) on the horizontal (the x-axis). The example ZND is indicated by a first region 1506 on the graph. In the example graph, the first region 1506 corresponding to the ZND extends between a temperature range of approximately 27° F. and 35° F. and between a pressure altitude range of approximately 0 (zero) feet and 14,000 feet.

Known ice accretion sensors often cannot detect the ZND phenomenon because of a temperature depression over an upper (e.g., top) surface of the aircraft wing. Specifically, the ZND phenomenon causes ice formation on a leading edge of a wing or other similar surfaces prior to ice formation on a probe of an ice accretion sensor because fluid flow characteristics at the leading edge of a wing may differ with fluid characteristics at a forward fuselage area where a probe of the ice accretion sensor is often located. In particular, an airfoil shape (e.g., a cambered shape) of the aircraft wing causes freestream air to flow with a greater velocity across an upper surface of the wing than a velocity of the freestream air across a lower surface (e.g., a bottom surface) of the wing opposite the upper surface. Such a fluid flow velocity differential causes a pressure differential between the upper surface and the lower surface of the wing because pressure is inversely proportional to the fluid flow velocity. Therefore, fluid flow pressure decreases over the upper surface of the wing as fluid flow velocity increases over the upper surface of the wing. Likewise, fluid flow pressure increases over the lower surface of the wing as fluid flow velocity decreases over the lower surface of the wing. Such a pressure differential also causes a temperature differential between the upper and lower surfaces of the wing because temperature is directly proportional to pressure. Therefore, as a pressure of the fluid decreases over the upper surface of the wing, a temperature of the fluid also decreases over the upper surface of the wing, and therefore may be lower than the freestream air temperature, which may be above freezing while the localized temperature on the upper surface may be below freezing. Thus, a temperature sensor located away from the wing senses a temperature of the freestream air that is greater than freezing, while the air temperature over the wing is at or less than freezing temperature. Therefore, such sensor may not accurately measure the temperature of the surface of the wing.

Some known aircraft employ ice detection systems that indicate a presence of moisture in air surrounding a probe of the detector. However, such detection systems rely on other sensors or systems of the aircraft operating together to provide an ambient temperature measurement prior to determining possible icing conditions. Although such detection systems account for the ZND phenomenon, such ice detection systems are complex, thereby increasing manufacturing costs, maintenance, etc.

Example ice detection systems disclosed herein eliminate concerns of the ZND phenomenon noted above. Additionally, example ice detection systems disclosed herein eliminate reliance on other more complex air data sources as a means of detecting icing conditions on an aircraft. Further, examples ice detection systems disclosed herein detect icing conditions on aircraft in real time (e.g., at all temperatures and conditions within Federal Aviation Administration icing regulations (i.e., 14 CFR Part 25, Appendix C and Appendix O icing envelopes)).

Example ice detection systems disclosed herein employ sensors having transitional substances. As used herein, a transitional substance is a material that is configured to change (e.g., in color) in a presence of or in response to a change in a predetermined condition. Specifically, example ice detection systems disclosed herein employ sensors having thermochromic and hydrochromic substances to detect icing conditions on aircraft surfaces such as, for example, a wing, an engine inlet, an empennage, etc. Specifically, a thermochromic substance changes color when a temperature of the thermochromic substance deviates from a predetermined or calibrated temperature threshold and hydrochromic devices change color when water or moisture accumulation on the hydrochromic surface exceeds a predetermined or calibrated threshold. Thus, the ice detection systems disclosed herein detect icing conditions by sensing color changes in the respective thermochromic and hydrochromic detectors based on temperature and water/moisture levels. In some examples, the ice detection systems disclosed herein are capable of detecting icing conditions at any temperature within the icing envelopes of Appendix C and Appendix O of 14 CFR part 25, thereby avoiding the zone of non-detection that can be caused by temperature depression effect on a wing of the aircraft.

Ice detection systems disclosed herein include a pair of detectors including a thermochromic detector (e.g., a first sensor) to sense a temperature of a freestream air flow relative to a temperature threshold and a hydrochromic detector (e.g., a second sensor) to sense to sense an amount of moisture in the freestream airflow relative to a moisture threshold. Specifically, the thermochromic detector changes color when a temperature of freestream airflow is less than or equal to a temperature threshold and the hydrochromic detector changes color when an amount of moisture in the freestream airflow is greater than a moisture threshold. The example ice detection systems disclosed herein sense the color change of the thermochromic detector and the hydrochromic detector to detect icing conditions. If the thermochromic sensor senses that a temperature of an airstream is less than or equal to a temperature threshold and the hydrochromic sensor senses that an amount of moisture in an airstream is greater than a moisture threshold, example ice detection systems disclosed herein detect possible icing conditions. In some examples, example ice detection systems disclosed herein cause activation of aircraft anti-icing systems in response to determining the icing conditions.

Specifically, known ice detector probes are sometimes unable to accrete ice at a same temperature as an airfoil surface due to the reasons noted above (e.g., the ZND phenomenon). However, the thermochromic devices disclosed herein provide an indication or signal that freezing temperatures (e.g., temperatures less than 32 degrees Fahrenheit) have been encountered on specific airfoil surface(s), while the hydrochromic devices disclosed herein provide an indication or signal of a presence or accumulation of water or moisture (e.g., present on a critical surface and/or in freestream air). The signals from the thermochromic and hydrochromic devices are evaluated together to detect icing conditions. In some examples, thermochromic and hydrochromic devices are visual indicators that provide a visual indication of potential icing conditions. Additionally, the thermochromic and hydrochromic devices described herein mitigate or eliminate the effects of ZND by alerting flight crew to the presence of potential icing conditions. In some examples, optical sensors can be employed to detect the signals from the thermochromic and hydrochromic devices, and the optical sensors can be configured (e.g., communicatively coupled) to transmit icing signals to a controller to automatically activate ice protection systems (e.g., anti-icing systems) in response to the thermochromic and the hydrochromic devices detecting icing conditions.

Figure 1:
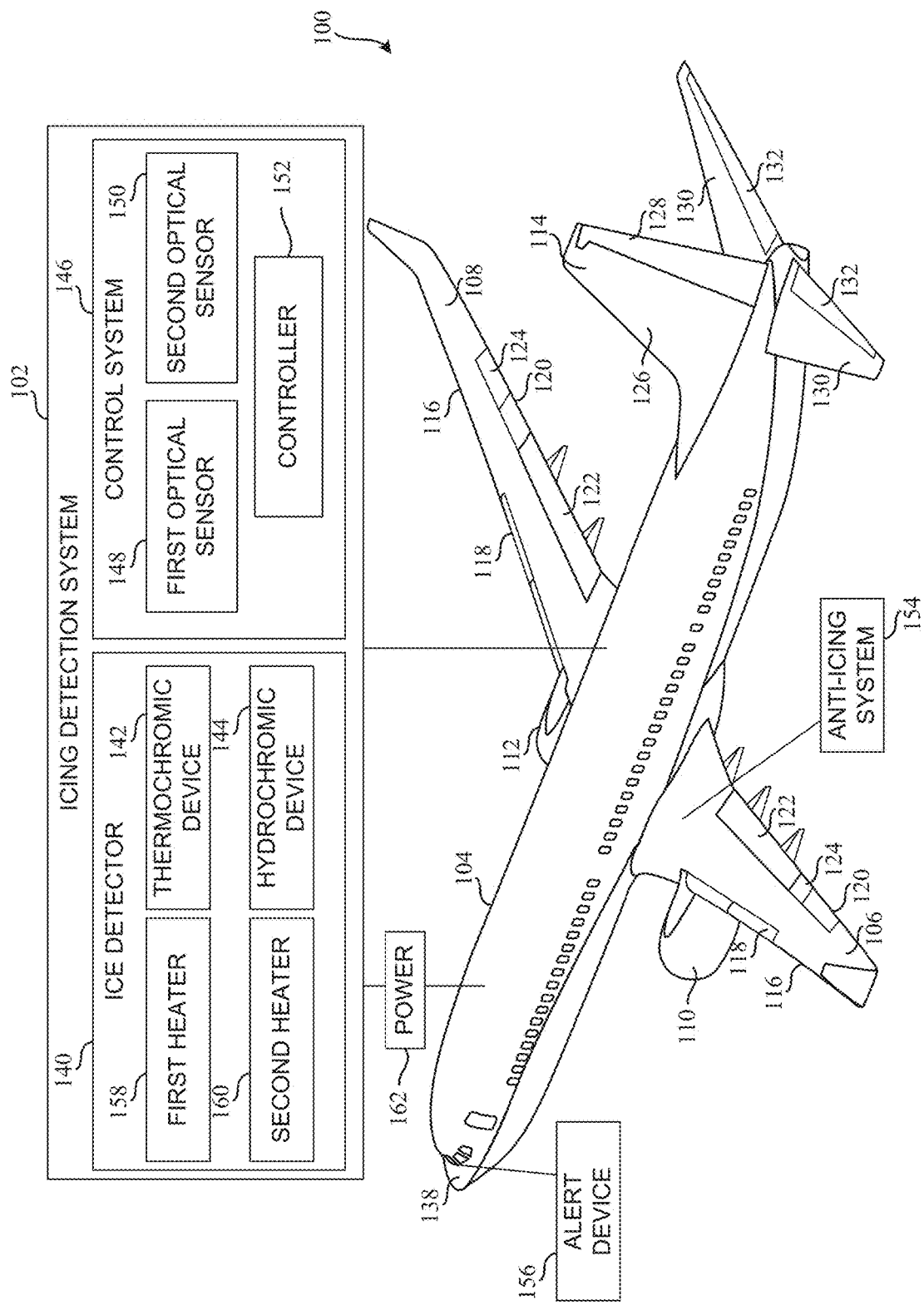
FIG. 1 illustrates an example aircraft having an example ice detection system in accordance with the teachings of this disclosure.

FIG. 1 illustrates an aircraft 100 implemented with an example ice detection system 102 in accordance with the teachings of this disclosure. The example ice detection system 102 disclosed herein is not limited to the aircraft 100 of FIG. 1. For example, the ice detection system 102 can be implemented with other types of aircraft. For example, the ice detection system 102 can be implemented with vertical takeoff and landing aircraft, military aircraft, helicopters, and/or any other type of aircraft. Additionally, the ice detection system 102 can be implemented with other types of vehicles including, but not limited to, a ship, a submarine, a vehicle (e.g., a racecar, a train, an automobile, a bus, etc.) and/or any other vehicle or aerodynamic surface(s).

The aircraft 100 of the illustrated example includes a fuselage 104, wings 106, 108, engines 110, 112 supported by the respective wings 106, 108, and an empennage 114. Each of the wings 106, 108 includes a leading edge 116 including slats 118 and a trailing edge 120 including flaps 122 and/or ailerons 124. The empennage 114 of the illustrated example includes a vertical stabilizer 126, a rudder 128, horizontal stabilizers 130, and elevators 132.

To detect icing conditions, the aircraft 100 of the illustrated example includes the ice detection system 102. The ice detection system 102 of the illustrated example detects ice accretion or formation on one or more surfaces (e.g., critical airfoil surfaces) of the aircraft 100 (e.g., the fuselage 104, the wings 106, 108, the leading edge 116, the trailing edge 120, the slats 118, the flaps 122 and/or the ailerons 124, the empennage 114, vertical stabilizer 126, the rudder 128, the horizontal stabilizers 130 and/or the elevators 132, etc.) and/or a nose 138 of the aircraft 100.

Additionally, the ice detection system 102 can detect icing conditions regardless of the zone of non-detection phenomenon. For example, the ice detection system 102 detects icing conditions (e.g., in real time) on the aircraft 100 at all temperature and pressure altitudes within the FAA icing regulations (e.g., within the icing envelopes published in 14 CFR Part 25, Appendix C and Appendix O). Thus, the ice detection system 102 detects real-time icing conditions on critical airfoil surfaces of the aircraft 100. As used herein, a "critical airfoil surface" of an aircraft includes any surface susceptible to the ZND phenomenon such as, for example, a wing, a leading edge of a wing, a surface of an engine inlet, a surface of an empennage, a fuselage surface, an airfoil, and/or any other surface of an aircraft that affects aerodynamic characteristic(s) of the aircraft.

The ice detection system 102 of the illustrated example includes an ice detector 140. Specifically, the ice detector 140 of the illustrated example includes a first or thermochromic device 142 (e.g., a first sensor) and a second or hydrochromic device 144 (e.g., a second sensor). In other words, the ice detector 140 disclosed herein has a pair of detectors that includes at least one of the thermochromic device 142 and the hydrochromic device 144. The thermochromic device 142 of the illustrated example is configured to sense a temperature of a surface of the thermochromic device 142 and/or a temperature of the freestream air relative to a temperature threshold. The hydrochromic device 144 of the illustrated example is configured to sense an amount of moisture or water vapor (e.g., accumulated on a hydrochromic material (e.g., a surface) of the hydrochromic device 144 relative to a moisture threshold (e.g., which is representative of an amount of moisture in the freestream air).

The ice detection system 102 can be configured to include a single ice detector 140 installed on one of the aircraft structures (e.g., the wing 108 or other critical surface) or can be configured to include a plurality of the ice detectors 140 located on different ones of the aircraft structures and/or critical surfaces (e.g., the wings 106, 108, the fuselage 104, the empennage 114, etc.). In some examples, to provide redundancy and a more robust or failsafe system architecture, a plurality of ice detectors 140 can be positioned on a plurality of aircraft surfaces (e.g., installed symmetrically on both sides of the aircraft 100). In some examples, the thermochromic device 142 of the illustrated example is located adjacent (e.g., immediately next to) the hydrochromic device 144. For example, in some examples, the thermochromic device 142 and the hydrochromic device 144 can be provided on the wing 108 of the aircraft 100. In some examples, the thermochromic device 142 is spaced a distance from the from the hydrochromic device 144. For example, in some such examples, the thermochromic device 142 is provided on the wing 108 and the hydrochromic device 144 is provided on the nose 138 of the aircraft 100, or other possible arrangements.

The thermochromic device 142 of the illustrated example includes a thermochromic material. As used herein, a thermochromic material is a material, substance or layer that changes color based on a temperature of the material. For example, the thermochromic device 142 of the illustrated example includes a calibrated thermochromic material that has a first color when exposed to a first temperature or temperature range and a second color when exposed to a second temperature or temperature range. In particular, the thermochromic material of the illustrated example can be calibrated to change between a first color (e.g., a blue color) when a temperature of the thermochromic material exceeds (e.g., is greater than) a temperature threshold (e.g., a freezing temperature, 32° F.) and a second color (e.g., a white color) different than or distinguishable from the first color when a temperature of the thermochromic material does not exceed (e.g., is less than or equal to) the temperature threshold. The temperature threshold can be, for example, a specific temperature at which ice can form on a critical surface of the aircraft 100, a specific temperature within the ZND threshold indicated in Graph 1 shown in FIG. 15 that can cause ice accretion on an airfoil surface of the aircraft 100, and/or any other desired temperature threshold or range.

Thus, the thermochromic device 142 has a thermochromic material(s) that includes properties or characteristics such that the thermochromic device 142 can transition between a first or base color and a second or non-base color based on a predetermined temperature (e.g., a temperature that causes ice accretion or, specifically, a temperature range of the ZND related to a specific airplane surface of concern for ice accretion). As shown in Graph 1 of FIG. 15, the temperature range or temperature threshold is typically within a few degrees below freezing (e.g., 27° F.-35° F.), but can be tuned or calibrated specifically for aerodynamic characteristics of an airfoil surface of concern. For example, the thermochromic device 142 can be coated with a thermochromic material having a base or primary color such as, for example, a blue color when a temperature sensed by the thermochromic material is greater than the temperature threshold (e.g., is greater than freezing) and can turn to a non-base or secondary color such as, for example, a white color when a temperature sensed by the thermochromic material is less than or equal to the temperature threshold. By using white as the secondary color, the ice detection system 102 can distinguish the second color from the first color irrespective of ice accretion (e.g., a thin layer of ice) over a sensing surface (e.g., the thermochromic material) of the thermochromic device 142. In some such examples, the thermochromic device 142 can have a blue base color when the temperature of the thermochromic material is greater than the threshold temperature (e.g., a freezing temperature) and a white secondary color when the temperature of the thermochromic material is less than or equal to the threshold temperature (e.g., is less than freezing). In some such examples, the thermochromic device 142 can detect icing conditions even if ice accretes on the thermochromic device 142 because the accreted ice will have a white color or a clear color, which will not alter the white base color.

Example thermochromic materials disclosed herein include thermochromic substance(s), layer(s), paint(s), ink(s), film(s), and/or any other suitable thermochromic material(s). In some examples, the thermochromic material(s) disclosed herein include liquid crystals. In some examples, the liquid crystals can be configured to cause a change in color based on a desired temperature threshold. An example thermochromic material employs a crystal structure (e.g., liquid crystals) embedded in a layer (e.g., a film, a paint, an ink, etc.). In some examples, a thermochromic sensor disclosed herein is provided by applying a thermochromic material to a surface of an aircraft. For example, in some examples, to provide a thermochromic sensor, a thermochromic material or layer can be painted on a critical airfoil surface. For example, the leading edge 116 of the wings 106, 108, an engine inlet of the engines 110, 112 and/or any other surface of the aircraft can include a thermochromic material (e.g., a paint, etc.). In some examples, one or more surfaces of the aircraft 100 (e.g., the leading edge 116 of the wings 106, 108) can be painted with a paint having thermochromic characteristic(s) or properties, thereby forming the thermochromic device 142. In some examples, the thermochromic device 142 includes a probe having a body (e.g., a rod, an airfoil, etc.) coated with a thermochromic material.

Light waves reflect from liquid crystals within the thermochromic material(s) and add together by a process called interference, which produces reflection. The color of the reflected light depends on a spacing between the liquid crystals of the crystal structure. A change in temperature also changes the spacing between the crystals, thereby altering an amount of interference and changing an amount of the reflected light which, in turn, affects a color of the reflect light. Thus, thermochromic liquid crystals, for example, can be configured or calibrated to provide an accurate measurement of temperature corresponding to a certain color band of reflected light, depending on a color of a base structure (e.g., a material, a paint, a structure, etc.) containing the crystals. Thus, the thermochromic device 142 reflects visible light having a first wavelength (e.g., a wavelength representative of a blue color) in response to a temperature of the thermochromic device 142 being greater than the temperature threshold and reflects visible light having a second wavelength (e.g., a wavelength representative of a white color) in response to a temperature of the thermochromic device 142 being less than or equal to the temperature threshold. Thus, the thermochromic material (e.g., the crystals) of the thermochromic device 142 can be calibrated to reflect light to change a color of the thermochromic device 142 at a predetermined temperature (e.g., a temperature threshold).

The hydrochromic device 144 of the illustrated includes a hydrochromic substance or material. For example, the hydrochromic device 144 of the illustrated example includes a calibrated hydrochromic material that changes color in response to accumulation of a specific amount of water or moisture (e.g., a moisture threshold) on the hydrochromic material. For example, the hydrochromic device 144 of the illustrated example can be calibrated to change between a first color (e.g., a third color) and a second color (e.g., a fourth color) different than or distinguishable from the first color when an amount of water or moisture accumulation on the hydrochromic material exceeds (e.g., is greater than) a moisture threshold (e.g., 0.01 inches per hour (in/hr))). In some examples, the hydrochromic device 144 changes color from, for example, a primary or abase color (e.g., a white color) to a secondary or non-base color (e.g., a gray color) different than the second color when moisture or water impinges on the hydrochromic device 144 (e.g., the hydrochromic material) and wets a surface (e.g., the hydrochromic material) of the hydrochromic device 144. In some examples, the hydrochromic material becomes transparent to reveal an underlying (e.g., the secondary) color of the hydrochromic device 144 when moisture or water impinges on the hydrochromic device 144 (e.g., the hydrochromic material).

Example hydrochromic materials include hydrochromic substance(s), layer(s), paint(s), ink(s), film(s), and/or any other suitable hydrochromic material(s). In some examples, the hydrochromic device 144 disclosed herein is provided by applying a hydrochromic material to a surface of an aircraft. For example, to provide the hydrochromic device 144, a hydrochromic material or layer can be applied (e.g., painted) to a critical airfoil surface. In some examples, the hydrochromic device 144 disclosed herein includes a probe having a body (e.g., a rod, an airfoil, etc.) coated with a hydrochromic material, where the probe is attached to the one or more structures or surfaces (e.g., the leading edge 116 of the wing 108, an engine inlet, etc.) of the aircraft 100.

The hydrochromic material of the hydrochromic device 144 is configured to absorb light at a first wavelength and absorb light at a second wavelength different than the first wavelength. Therefore, the hydrochromic device 144 absorbs light at a first wavelength causing it to appear to have a first color when the hydrochromic material is dry (e.g., a negligible amount of moisture or water accumulation on the hydrochromic material) and absorbs light at a second wavelength causing it to be transparent and/or appear to have a second color in the presence of water or moisture. Thus, the hydrochromic device 144 reflects visible light having a third wavelength in response to a first amount of moisture on the hydrochromic device 144 not exceeding the moisture threshold and to reflect visible light having a fourth wavelength in response to a second amount of moisture on the hydrochromic device 144 exceeding the moisture threshold. Thus, the hydrochromic material (e.g., crystals) can be calibrated to reflect light in a manner that causes the hydrochromic device 144 to change color in response to a specific amount of moisture or water vapor (e.g., a moisture threshold).

The ice detector 140 (e.g., the thermochromic device 142 and the hydrochromic device 144) is in freestream air. The ice detection system 102 of the illustrated example continuously monitors the ice detector 140 (e.g., in real time) for indication of a color change of the thermochromic device 142 (e.g. to detect for freezing temperatures) and, likewise, a color change of the hydrochromic device 144 (e.g., to detect for water/moisture that can cause ice formation).

Figure 16:
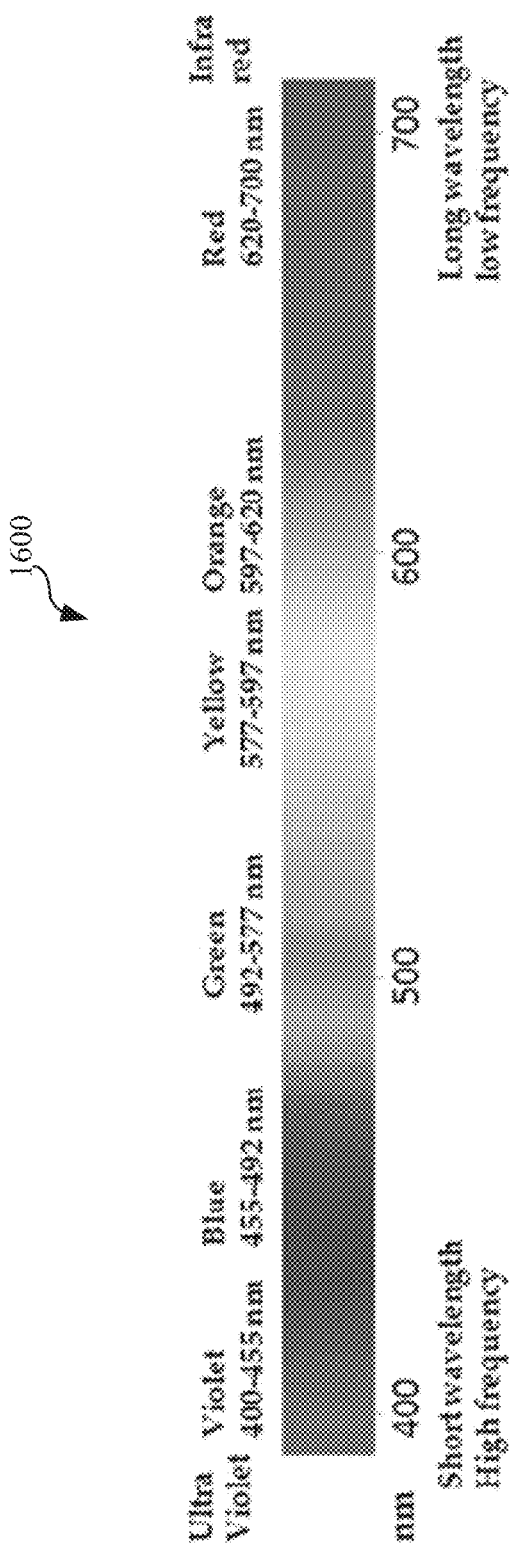
FIG. 16 is a graph illustrating various light wavelengths.

To detect changes in the colors of the thermochromic device 142 and the hydrochromic device 144, the ice detection system 102 of the illustrated example includes a control system 146. The control system 146 of the illustrated example includes a first optical sensor 148 and a second optical sensor 150 communicatively coupled to an electronic controller 152. The first optical sensor 148 of the illustrated example is associated with the thermochromic device 142 and the second optical sensor 150 of the illustrated example is associated with the hydrochromic device 144. Specifically, the first optical sensor 148 is a first photodiode and the second optical sensor 150 is a second photodiode. As used herein, an "optical sensor" or "photodiode" is a semiconductor device that converts light into an electrical current and/or that, based on a material used, reacts to a wavelength of light absorbed from, for example, the thermochromic device 142 and the hydrochromic device 144. FIG. 16 is a graph 1600 (e.g., Graph 2) illustrating various colors within the visible light spectrum that have distinct wavelengths. The first optical sensor 148 may detect the wavelength of light by using a photodiode with a specific spectral responsivity, or it may include a lens or filter that is calibrated to allow only certain wavelengths of light to pass through.

The first optical sensor 148 is configured to sense or monitor a change in color of the thermochromic device 142 and the second optical sensor 150 is configured to sense a change in color of the hydrochromic device 144. For example, the first optical sensor 148 and the second optical sensor 150 can distinguish or recognize the difference between, for example, a white color, which has equal light transmission at all the visible color wavelengths, and a blue color, which has a distinct wavelength of approximately 450-500 nanometers (e.g., as shown in the example graph 1600 of FIG. 16). Thus, the first optical sensor 148 senses between a baseline (e.g., the first or blue) color characteristic of the thermochromic device 142 indicative of a temperature (e.g., of a surface of the thermochromic device 142 or the freestream air) exceeding (e.g., greater than) a temperature threshold and a non-baseline (e.g., the second or white) color characteristic of the thermochromic device 142 indicative of a temperature (e.g., of a surface of the thermochromic device 142 or the freestream air) being less than or equal to the temperature threshold. Likewise, the second optical sensor 150 senses between a baseline (e.g., the third or gray) color characteristic of the hydrochromic device 144 indicative of a moisture or water vapor level (e.g., on a surface of the hydrochromic device 144 or the freestream air) being less than a moisture threshold (e.g., dry air, dry surface, etc.) and a non-baseline (e.g., the fourth or white) color characteristic of the hydrochromic device 144 indicative of a moisture or water vapor level (e.g., on a surface of the hydrochromic device 144 or the freestream air) being greater than or equal to the moisture threshold (e.g., a moisture level that can cause ice formation).

To monitor output signals from the first optical sensor 148 and the second optical sensor 150, the ice detection system 102 of the illustrated example includes the electronic controller 152. The electronic controller 152 of the illustrated example is an integral part of the ice detection system 102. In some examples, the electronic controller 152 can be housed within a controller (e.g., a federated controller) located elsewhere in the aircraft 100 such as, for example, in an electronics bay of the aircraft 100.

To detect an icing condition, the electronic controller 152 detects for possible icing conditions based on output signals from the first optical sensor 148 and the second optical sensor 150. Specifically, the electronic controller 152 of the illustrated example determines possible icing conditions when a combination of freezing temperatures and a threshold amount of accumulation of water or moisture are detected by the first optical sensor 148 and the second optical sensor 150, respectively. For example, the electronic controller 152 of the illustrated example monitors the first optical sensor 148 and the second optical sensor 150 for changes in the color of the thermochromic device 142 and the hydrochromic device 144, which would indicate a temperature below a temperature threshold (e.g., at or below freezing) and a presence of moisture/water vapor greater than a moisture threshold. Thus, the electronic controller 152 of the illustrated example determines if the first optical sensor 148 detects a change in color of the thermochromic device 142 (e.g., from a blue color to a white color) in response to a temperature being less than or equal to a temperature threshold and determines if the second optical sensor 150 detects a change in color of the hydrochromic device 144 (e.g., from a gray color to a white color) in response to a moisture or water vapor level exceeding (e.g., being greater than or equal to) a moisture threshold. Thus, the electronic controller 152 of the illustrated example detects an icing condition in response to both the first optical sensor 148 and the second optical sensor 150 detecting changes in color of the respective thermochromic device 142 and the hydrochromic device 144.

However, if the first optical sensor 148 senses the thermochromic device 142 changing from a first color to a second color indicative of a temperature being less than or equal to a temperature threshold, but the second optical sensor 150 does not sense a change in color of the hydrochromic device 144 (e.g., detects the hydrochromic device 144 in the first, gray, or base line color) indicative of a moisture or water vapor level being less than a moisture threshold, the electronic controller 152 determines that an icing condition does not exist. In other words, the electronic controller 152 determines that an icing condition is not detected because, although the temperature is below freezing, the detected moisture level being less than the moisture threshold is insufficient to cause formation of ice (e.g., on the wings 106, 108 or other surfaces of concern). Alternatively, if the second optical sensor 150 senses a change in color (e.g., from gray to white) of the hydrochromic device 144 (e.g., indicative of moisture or water vapor level exceeding a moisture threshold), but the first optical sensor 148 does not sense a change in color of the thermochromic device 142 (e.g., indicating a temperature exceeding a temperature threshold), the electronic controller 152 determines that an icing condition does not exist because the temperature is too high to cause ice accretion of the moisture or water vapor (e.g., on the wings 106, 108 or other surfaces of concern).

In some examples, in response to detecting an icing condition, the electronic controller 152 activates an anti-icing system 154 and/or any other ice protection system(s) of the aircraft 100. In some examples, the electronic controller 152 activates an alert device 156 in response to detecting an icing condition. The alert device 156 can be located in a flight deck of the aircraft 100. The alert device 156 can include, for example, a visual indicator (e.g., a light), an audible indicator (e.g., an alarm), a combination of a visual indicator and an audible indicator, and/or any other alarm device to provide notification to a flight crew. For example, the electronic controller 152 can transmit icing condition signals simultaneously to, for example, the alert device 156 in the flight deck to alert the pilots and to a federated ice protection system controller, for example, located in an electronics bay to initiate automatic activation of appropriate ice protection system(s). These icing condition signals could be transmitted via direct hard-wired signals, wireless signals and/or a digital data bus. Only when both the thermochromic device 142 and the hydrochromic device 144 change from their respective primary colors to their secondary colors is an icing indication signal transmitted by the electronic controller 152. When one or both of the thermochromic device 142 and the hydrochromic device 144 change color back to their respective primary colors (e.g., to an initial or original state), the electronic controller 152 determines that the icing condition has ended or no longer present, and the electronic controller 152 cancels the icing output signal to the ice protection system(s) and/or the alert device 156.

To device (e.g., prevent ice accumulation on) the thermochromic device 142 and/or the hydrochromic device 144, the ice detection system 102 of the illustrated example includes a first heater 158 and a second heater 160. The first heater 158 is associated with the thermochromic device 142 and the second heater 160 is associated with the hydrochromic device 144. For example, the first heater 158 and the second heater 160 of the illustrated example includes one or more internal electric heating coils or circuits formed with the respective thermochromic device 142 and the hydrochromic device 144. In some examples, the ice detection system 102 includes a plurality of thermochromic devices 142 and/or a plurality of hydrochromic devices 144. In some such examples, the ice detection system 102 includes a plurality of first heaters 158 and/or a plurality of second heaters 160. In other words, respective ones of the thermochromic devices 142 includes corresponding respective ones of the first heaters 158, and respective ones of the hydrochromic devices 144 includes corresponding respective ones of the second heaters 160.

The ice detection system 102 (e.g., the controller) activates the second heater 160 to prevent a surface of the hydrochromic device 144 from freezing or accumulating ice and inaccurately sensing moisture content during operation of the ice detection system 102 during operation of the ice detection system 102. For example, the second heater 160 applies heat continuously to the hydrochromic device 144 during operation of the ice detection system 102 to maintain a surface temperature of the hydrochromic device 144 above a freezing temperature to prevent formation or accumulation of ice on the hydrochromic device 144, which can prevent the hydrochromic device 144 from sensing moisture and/or water vapor.

Additionally, to device or restore the thermochromic properties of the thermochromic device 142 (e.g., reset the color of the thermochromic device 142 to the base color) after detection of an icing condition, the ice detection system 102 of the illustrated example activates the first heater 158. For example, the electronic controller 152 commands or activates the first heater 158 associated with the thermochromic device 142 to apply heat and increase a temperature of the thermochromic device 142 to a temperature greater than the temperature threshold to restore the thermochromic properties. However, the electronic controller 152 of the illustrated example is configured to activate the first heater 158 after an icing condition is detected (e.g., after both the thermochromic device 142 senses a temperature associated with an icing condition and the hydrochromic device 144 senses a moisture level associated with an icing condition). In other words, for example, the thermochromic device 142 is heated to change or restore the thermochromic device 142 from the second color (e.g., the non-base color) to the first color (e.g., the base color) in response to the thermochromic device 142 detecting a temperature less than or equal to the temperature threshold and the hydrochromic device 144 detecting a moisture level greater than or equal to the moisture threshold. After the thermochromic device 142 is heated to a temperature that allows the thermochromic device to return to its base color (e.g., a temperature greater than the temperature threshold), the electronic controller 152 deactivates the first heater 158 to enable the thermochromic device 142 to continue monitoring for possible icing conditions.

In some examples, the ice detection system 102 does not include the control system 146. In some such examples, the ice detection system 102 includes the ice detector 140. Specifically, the ice detector 140 is visible to the flight crew (e.g., positioned in a pilot's line of sight looking outward from the cockpit). For example, the ice detector 140 can be located or installed on or adjacent to the nose 138. In some such examples, a flight crew member (e.g., the pilot) manually activates the anti-icing system 154 in response to visually detecting a color change of the thermochromic device 142 indicative of a temperature associated with freezing conditions and visually detecting a color change of the hydrochromic device 144 indicative of a moisture level (e.g., a humidity level) associated with freezing conditions.

A power source 162 of the aircraft supplies power to the ice detection system 102. For example, the power source 162 provides electrical power to the first optical sensor 148, the second optical sensor 150, the electronic controller 152, the first heater 158 and the second heater 160.

Figure 2:
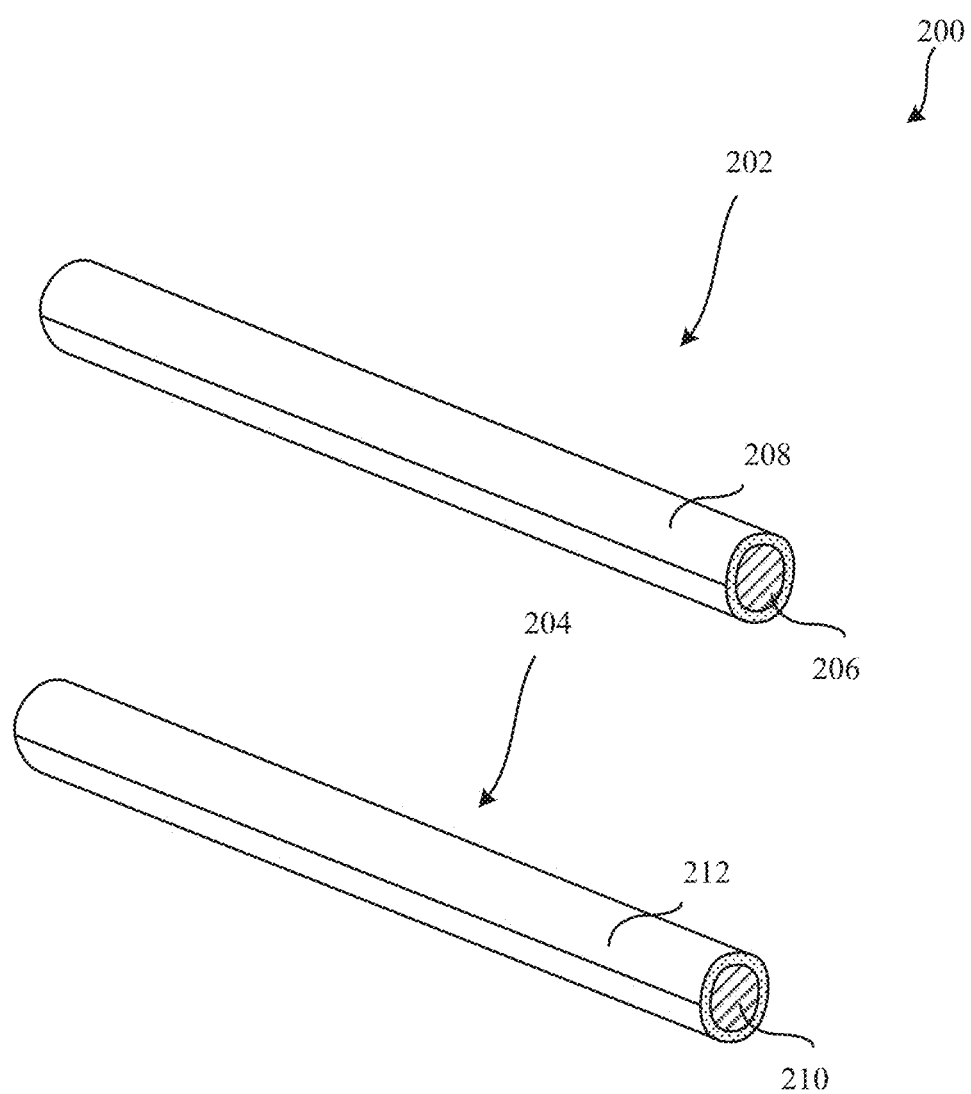
FIG. 2 is a schematic illustration of a first example ice detector that can implement the example ice detection system of FIG. 1.

FIG. 2 is an example ice detector 200 disclosed herein that can implement the example ice detector 140 of FIG. 1. Specifically, the ice detector 200 of the illustrated example includes a first sensor or thermochromic device 202 and a second sensor or hydrochromic device 204. Specifically, the thermochromic device 202 of the illustrated example includes a first probe 206 and a thermochromic layer 208. For example, the first probe 206 of the illustrated example is a cylindrical body (e.g., a rod) that is coated with a thermochromic substance using, for example, liquid crystal technology. The hydrochromic device 204 of the illustrated example includes a second probe 210 and a hydrochromic layer 212. For example, the second probe 210 of the illustrated example is a cylindrical body (e.g., a rod) that is coated with a hydrochromic substance. The first probe 206 and the second probe 210 of the illustrated example can be composed of metallic material (e.g., aluminum, steel, etc.), a plastic material, an alloy, a composite material, and/or any other suitable material(s). The thermochromic device 202 and/or the first probe 206 and the hydrochromic device 204 and/or the second probe 210, for example, can have a diameter of approximately between ¼ inch and 1 inch (e.g., ½ inch diameter) and can have a length between approximately 2 inches and 6 inches (e.g., 4 inches long). Additionally, when coupled to the aircraft (e.g., the aircraft 100), the thermochromic device 202 and the hydrochromic device 204 can be spaced (e.g., vertically) by approximately between 2 inches and 6 inches (e.g., 4 inches).

Figure 3:
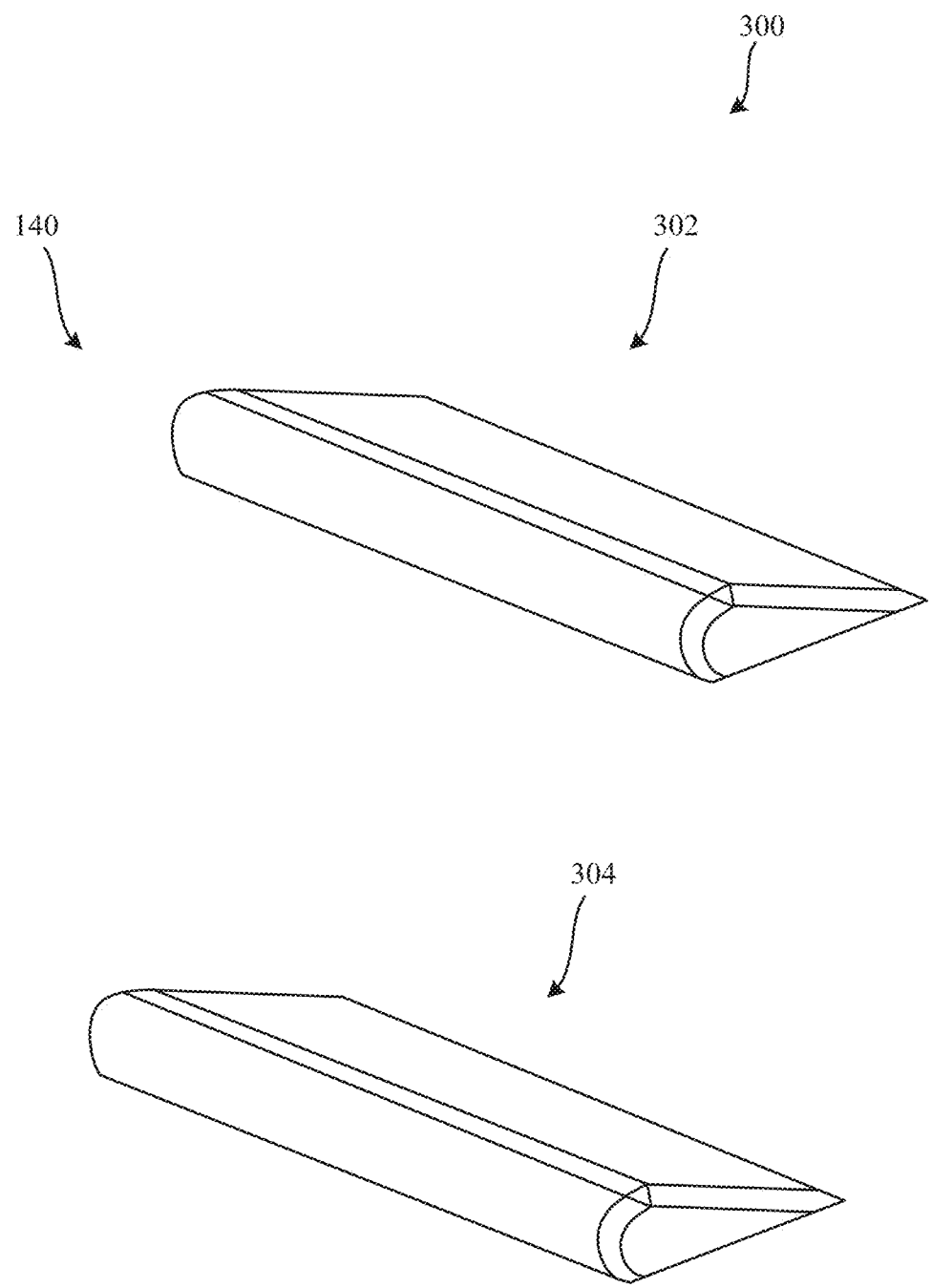
FIG. 3 is a schematic illustration of a second example ice detector that can implement the ice detection system of FIG. 1.

FIG. 3 is another example ice detector 300 disclosed herein that can implement the example ice detector 140 of FIG. 1. Specifically, the ice detector 300 of the illustrated example includes a first sensor or thermochromic device 302 that can implement the thermochromic device 142 and a second sensor or hydrochromic device 304 that can implement the hydrochromic device 144. Specifically, the thermochromic device 302 of the illustrated example is a first probe having an airfoil shape that is coated with a thermochromic substance using, for example, liquid crystal technology. The hydrochromic device 304 of the illustrated example is a second probe having an airfoil shape that is coated with a hydrochromic substance. For example, the thermochromic device 302 and/or the hydrochromic device 304 of the illustrated example can have a base structure composed of metallic material (e.g., aluminum, steel, etc.), a plastic material, an alloy, a composite material, and/or any other suitable material(s) coated with respective thermochromic and hydrochromic materials. In some examples, the base structures are painted with respective thermochromic and hydrochromic material(s) (e.g., embedded in the paint). The airfoil shapes of the thermochromic device 302 and the hydrochromic device 304 increase aerodynamic characteristic(s) (e.g., present less excrescence drag during operation).

FIGS. 4-10 illustrate various example ice detection systems 400, 500, 700 and 900 that can implement the example ice detection system 102 of FIG. 1. Those components of the ice detection systems 400, 500, 700 and 900 of FIGS. 4-10 that are substantially similar or identical to the components of the example ice detection system 102 of FIG. 1 described above and that have functions substantially similar or identical to the functions of those components will not be described in detail again below. Instead, the interested reader is referred to the above corresponding descriptions. To facilitate this process, identical reference numbers will be used for like structures.

Figure 4:
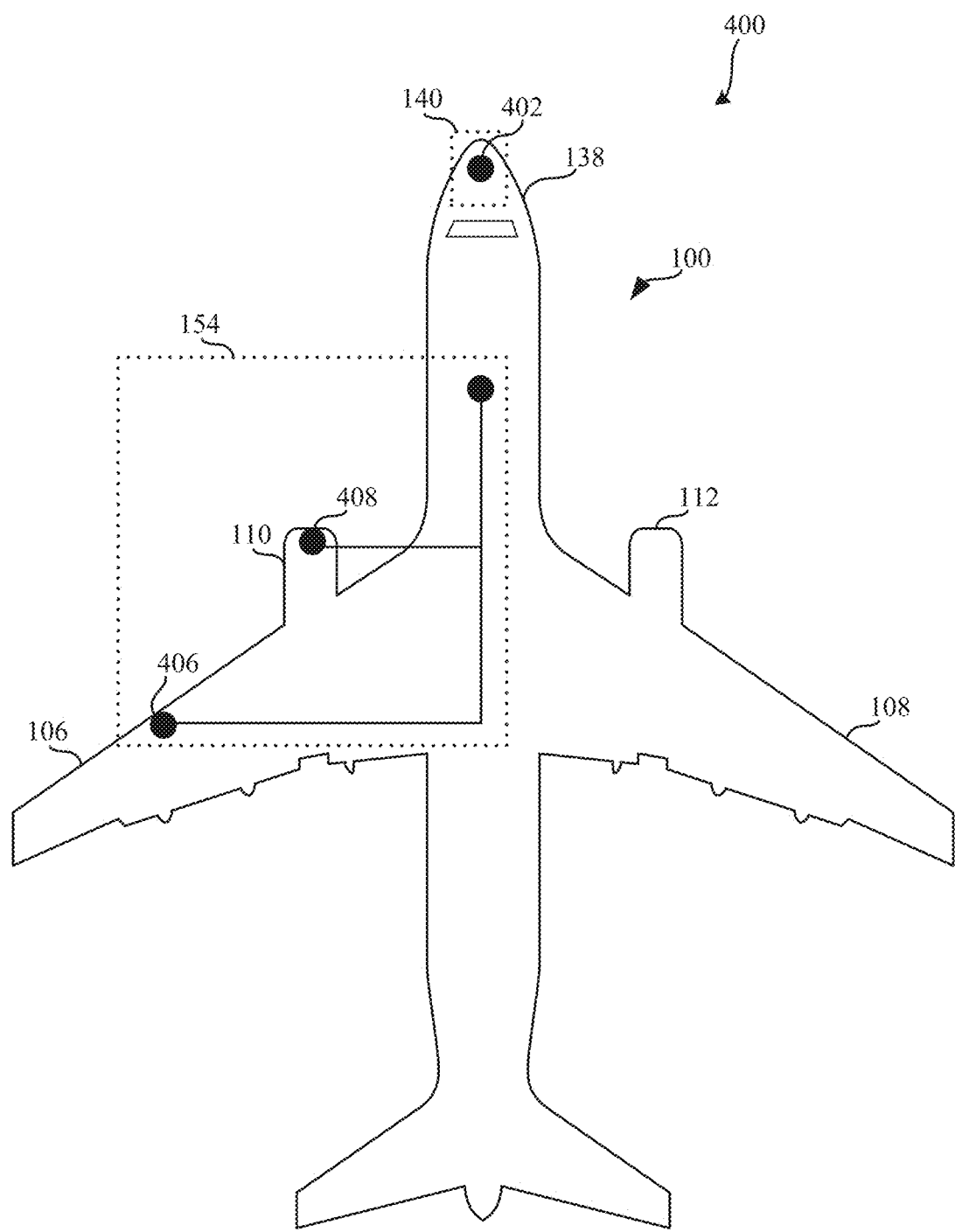
FIG. 4 is another example ice detection system disclosed herein.

FIG. 4 illustrates another example ice detection system 400 disclosed herein. The ice detection system 400 of the illustrated example includes an ice detector 402. The ice detector 402 of the illustrated example can be implemented by the thermochromic device 142 and a hydrochromic device 144 of FIG. 1, the thermochromic device 202 and the hydrochromic device 204 of FIG. 2, or the thermochromic device 302 and the hydrochromic device 304 of FIG. 3. The ice detector 402 of the illustrated example is a visual indicator to detect the presence of a potential icing condition. The ice detector 402 of the illustrated example is located (e.g., installed) on a forward fuselage area (e.g., the nose 138) of the aircraft 100 within view of the flight deck and/or the flight crew. In such example, thermochromic and hydrochromic reactions of the ice detector 402 are visible to the pilots and would provide an indication of potential icing conditions. In some such examples, the aircraft crew (e.g., a pilot) can manually activate the anti-icing system 154 of the aircraft 100 when the aircraft crew notices a change in color in both the thermochromic device and the hydrochromic device of the ice detector 402. For example, the anti-icing system 154 includes a wing anti-icing system 406 to anti/device the wings 106, 108 and an engine anti-icing system 408 to anti/device engine inlets of the engines 110, 112. Additionally, the example ice detector 402 of the illustrated example can be installed in an area typical of existing ice detection systems of the aircraft 100. Thus, in some examples, the aircraft 100 can be retrofit with the ice detection system 400.

Figure 5:
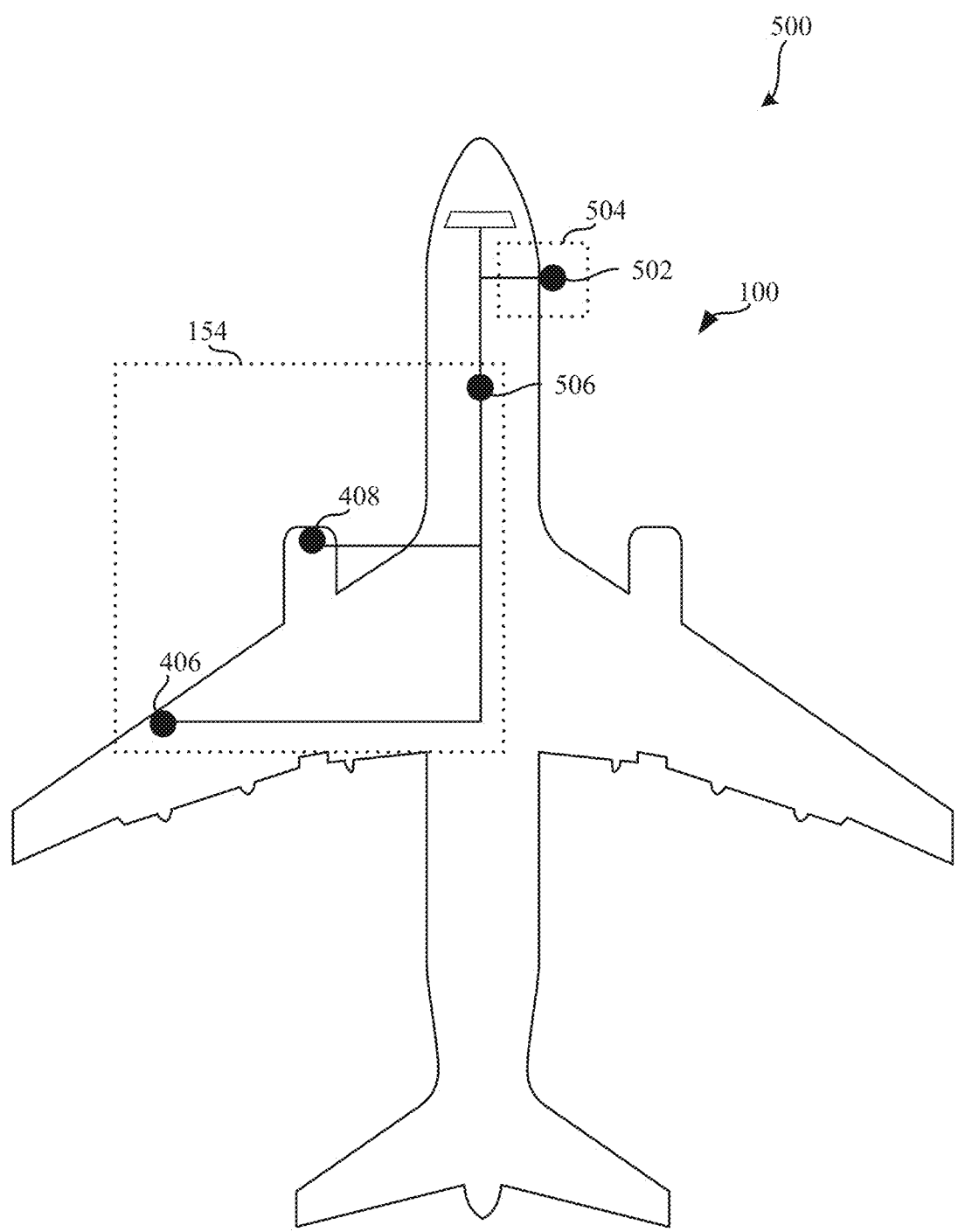
FIG. 5 is another example ice detection system disclosed herein.

FIG. 5 is another example ice detection system 500 disclosed herein that can implement the example ice detection system 102 of FIG. 1. For example, the ice detection system 500 of the illustrated example includes an ice detector 502 to implement the ice detector 140 of FIG. 1 and a control system 504 to implement the control system 146 of FIG. 1. The ice detection system 500 of the illustrated example is communicatively and/or operatively coupled to a federated controller 506 located, for example, in an electronics bay of the aircraft 100. In response to detecting an icing condition, the ice detection system 500 of the illustrated example activates the anti-icing system 154 (e.g., the wing anti-icing system 406, the engine anti-icing system 408, and/or any other anti-icing or icing protection system(s) of the aircraft 100) via the federated controller 506.

Figure 6:
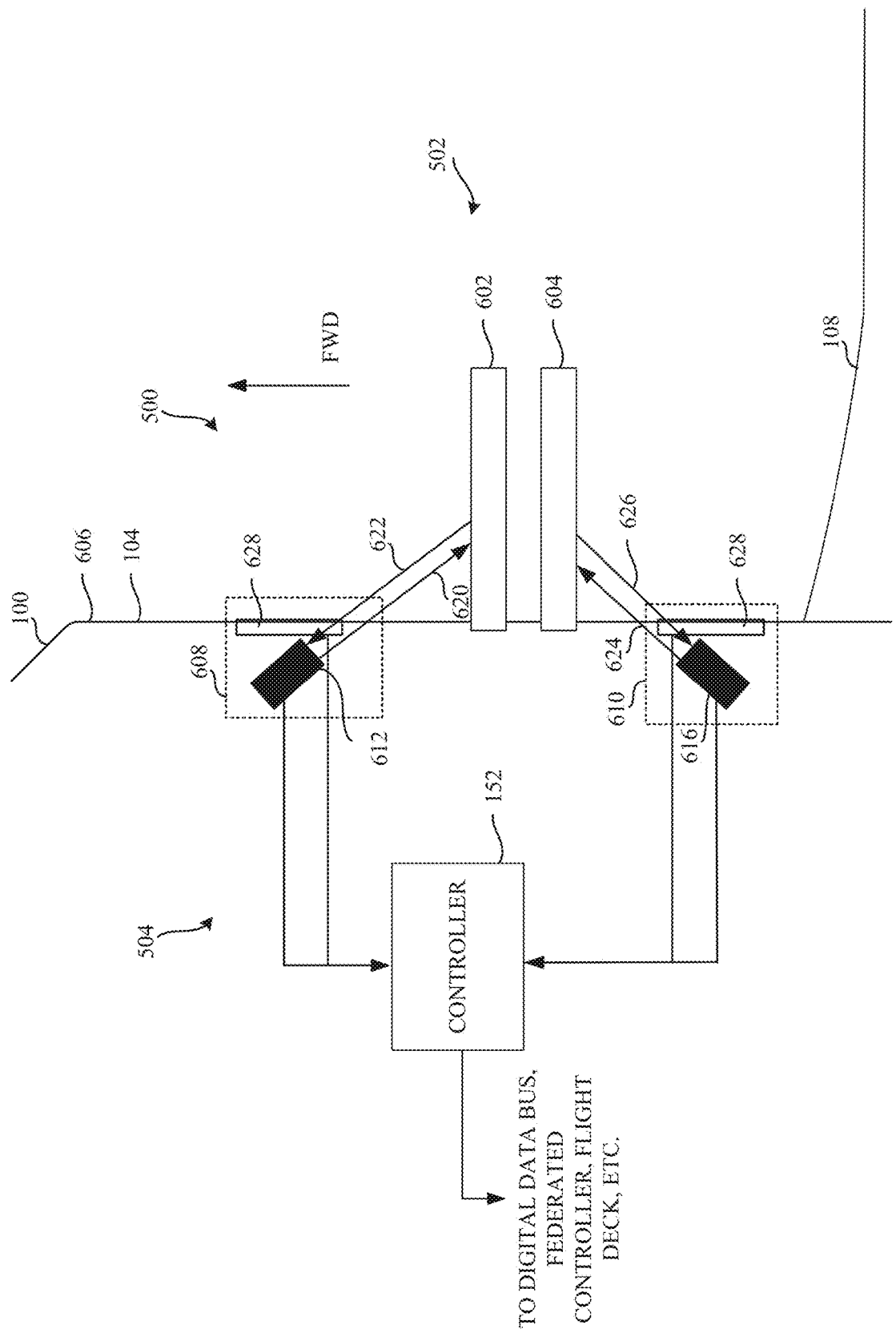
FIG. 6 is a schematic view of the example ice detection system of FIG. 5.

FIG. 6 is a plan, schematic view of the ice detector 502 of FIG. 5. Referring to FIG. 6, the ice detector 502 of the illustrated example includes a thermochromic device 602 and a hydrochromic device 604. The ice detector 502 of the illustrated example can be implemented with the thermochromic device 142 and the hydrochromic device 144 of FIG. 1, the thermochromic device 202 and the hydrochromic device 204 of FIG. 2, or the thermochromic device 302 and the hydrochromic device 304 of FIG. 3. The thermochromic device 602 and the hydrochromic device 604 of the illustrated example extend from a fuselage surface 606 (e.g., an outer surface of the fuselage 104) of the aircraft 100. For example, the thermochromic device 602 and the hydrochromic device 604 extend from the fuselage 104 a distance or length of approximately between 3 inches and 6 inches (e.g., four inches) and can be spaced laterally (e.g., vertically) from each other by approximately between 3 inches and 6 inches (e.g., 4 inches). In some examples, an aerodynamic analysis of a localized flow field on the thermochromic device 602 and the hydrochromic device 604 can be performed to determine optimum locations and/or lengths of the thermochromic device 602 and the hydrochromic device 604 such that the thermochromic device 602 and the hydrochromic device 604 extend beyond a boundary layer of the fuselage 104 to sense freestream air temperature and moisture (e.g., water droplet) conditions, respectively.

To detect icing conditions and/or to activate an anti-icing system 154, the ice detection system 500 of the illustrated example includes the control system 504. To detect or identify the thermochromic characteristic(s) of the thermochromic device 602, the ice detection system 500 of the illustrated example includes a first optical sensor 608 (e.g., a color sensor, an electro-optical sensor, the first optical sensor 148). To detect or identify the hydrochromic characteristic(s) of the hydrochromic device 604, the ice detection system 500 of the illustrated example includes a second optical sensor 610 (e.g., color sensor, an electro-optical sensor, the second optical sensor 150). The first and second optical sensors 608 and 610 are photodiodes and/or any other sensors that can detect or sense colors of the thermochromic device 602 and the hydrochromic device 604. For example, the first optical sensor 608 of the illustrated example includes a first transceiver 612 and the second optical sensor includes a second transceiver 616.

The first optical sensor 608 is oriented toward the thermochromic device 602. To sense a color of the thermochromic device 602, the first optical sensor 608 of the illustrated example emits a beam of light 620 toward the thermochromic device 602 and receives light 622 that reflects or bounces off the thermochromic device 602 and returns to the first optical sensor 608. Based on a color of the thermochromic device 602, the reflected light will have varying wavelengths. For example, if the thermochromic device 602 senses a temperature of the freestream air exceeds (e.g., is greater than) a temperature threshold (e.g., a freezing temperature), the thermochromic device 602 has a first color (e.g., a blue color). The reflected light 622 received by the first optical sensor 608 has a wavelength (e.g., associated with the first color (e.g., a blue color) of the thermochromic device 602. If the thermochromic device 602 senses a temperature of the freestream air that is less than or equal to a temperature threshold (e.g., a freezing temperature), the thermochromic device 602 has a second color (e.g., a white color) different than the first color. The reflected light 622 received by the first optical sensor 608 has a wavelength associated with the second color of the thermochromic device 602.

The second optical sensor 610 is oriented toward the hydrochromic device 604. To sense a color of the hydrochromic device 604, the second optical sensor 610 of the illustrated example emits a beam of light 624 toward the hydrochromic device 604 and receives light 626 that reflects or bounces off the hydrochromic device 604 and returns to the second optical sensor 610. Based on a color of the hydrochromic device 604, the reflected light will have varying wavelengths. For example, if the hydrochromic device 604 senses a moisture content of the freestream air that does not exceed (e.g., is less than) a moisture threshold (e.g., a moisture content indicative of icing conditions), the hydrochromic device 604 has a third color (e.g., a gray color, etc.). The reflected light 626 received by the second optical sensor 610 has a wavelength associated with the third color of the hydrochromic device 604. If the hydrochromic device 604 senses a moisture content of the freestream air that exceeds (e.g., is greater than or equal to) a moisture threshold, the hydrochromic device 604 has a fourth color (e.g., a white color) different than the third color. The reflected light 626 received by the second optical sensor 610 has a wavelength associated with the fourth color of the hydrochromic device 604. In the illustrated example, the first color is different than the second color, the third color and the fourth color, the second color is different than the third color and the fourth color, and the third color is different than the fourth color. In some examples, the first color is the same as the third color, and/or the second color is the same as the fourth color.

To protect the first optical sensor 608 and the second optical sensor 610, each of the first and second optical sensors 608 and 610 includes a cover 628. The cover 628 of the illustrated example is composed of glass. However, in other examples, the cover 628 can be composed of a transparent material (e.g., plastic, fiberglass, etc.) and/or any other suitable material to enable the first optical sensor 608 and the second optical sensor 610 to monitor the thermochromic device 602 and the hydrochromic device 604, respectively. The cover 628 installed flush with the fuselage surface 606 adjacent (e.g., forward or rearward of) the thermochromic device 602 and the hydrochromic device 604. With the cover 628 flush mounted relative to the fuselage surface 606, the first optical sensor 608 and the second optical sensor 610 are installed at an angle (e.g., between parallel and perpendicular) so they face toward the cover 628 with the first and second optical sensors 608 and 610 aimed at the thermochromic device 602 and the hydrochromic device 604, respectively. Additionally, to prevent ice or fog formation on the cover 628 that could interfere with or obstruct the first optical sensor 608 and the second optical sensor 610, the cover 628 can be electrically heated (e.g., via electrical power supplied by the power source 162). In some examples, to adjust (e.g., increase or fine-tune) a sensitivity of the first and second optical sensors 608, 610, a lens (e.g., a filter or filtering lens) can be placed in front of the respective first and second optical sensors 608, 610 to further attenuate light outside of a relevant spectrum. The filtering lens may be directly incorporated into the optical sensor 608 (or the second optical sensor 610), or it may be mounted separately in the path of the reflected light. In addition to the first and second optical sensors 608, 610, a light-emitting diode (LED) or other similar light emitting device or bulb can be installed adjacent to the first and second optical sensors 608, 610 such that it emits light focused through the cover 628 and toward the respective thermochromic device 602 and the hydrochromic device 604 as a visual aid during nighttime or other conditions with reduced lighting.

To detect output signals from the first optical sensor 608 and the second optical sensor 610, the ice detection system 500 of the illustrated example includes the electronic controller 152. The electronic controller 152 of the illustrated example receives a first signal (e.g., a first signal output level) from the first optical sensor 608 representative of the thermochromic device 602 having the first color or a second signal (e.g., a second signal output level) from the first optical sensor 608 representative of the thermochromic device 602 having the second color. Likewise, the electronic controller 152 of the illustrated example receives a third signal (e.g., a third signal output level) from the second optical sensor 610 representative of the hydrochromic device 604 having the third color or a fourth signal (e.g., a fourth signal output level) from the second optical sensor 610 representative of the hydrochromic device 604 having the fourth color. In some examples, each of the first optical sensor 608 and the second optical sensor 610 can have one output, which would be detected as a "logic low" or a "logic high" signal output level based on a detected or measured voltage or current output levels of the respective first and second optical sensors 608, 610. In turn, the electronic controller 152 determines that icing conditions are present and activates the anti-icing system 154 in response to detecting an icing condition.

Figure 7:
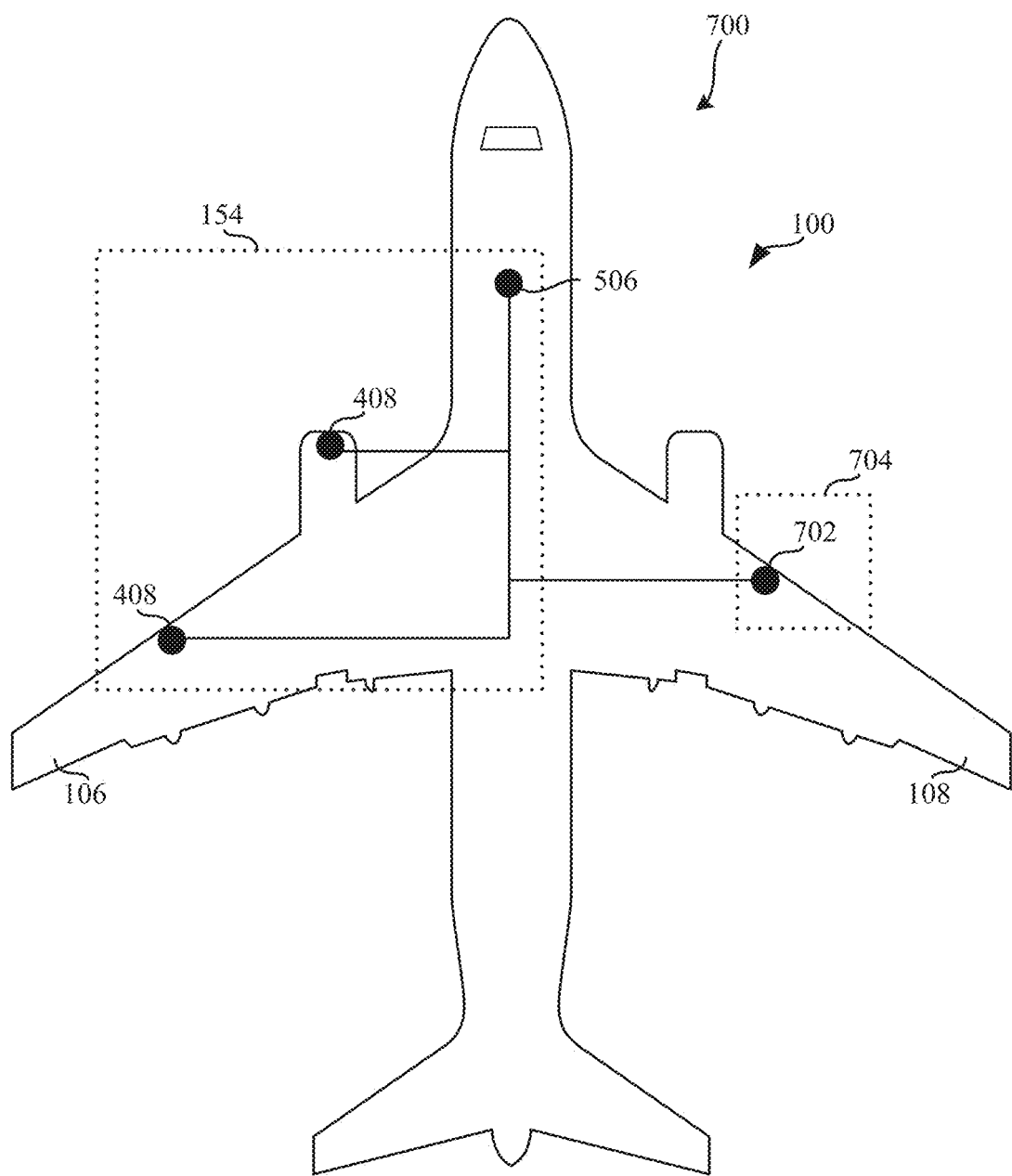
FIG. 7 is yet another example ice detection system disclosed herein.

FIG. 7 is another example ice detection system 700 disclosed herein that can implement the example ice detection system 102 of FIG. 1. The ice detection system 700 of the illustrated example includes an ice detector 702 that implements the ice detector 140 of FIG. 1 and a control system 704 that implements the control system 146 of FIG. 1. The ice detection system 700 of the illustrated example is communicatively and/or operatively coupled to the federated controller 506. In response to detecting an icing condition, the ice detection system 700 of the illustrated example activates the anti-icing system 154 (e.g., the wing anti-icing system 406, the engine anti-icing system 408, and/or any other anti-icing or icing protection system(s) of the aircraft 100).

Figure 8:
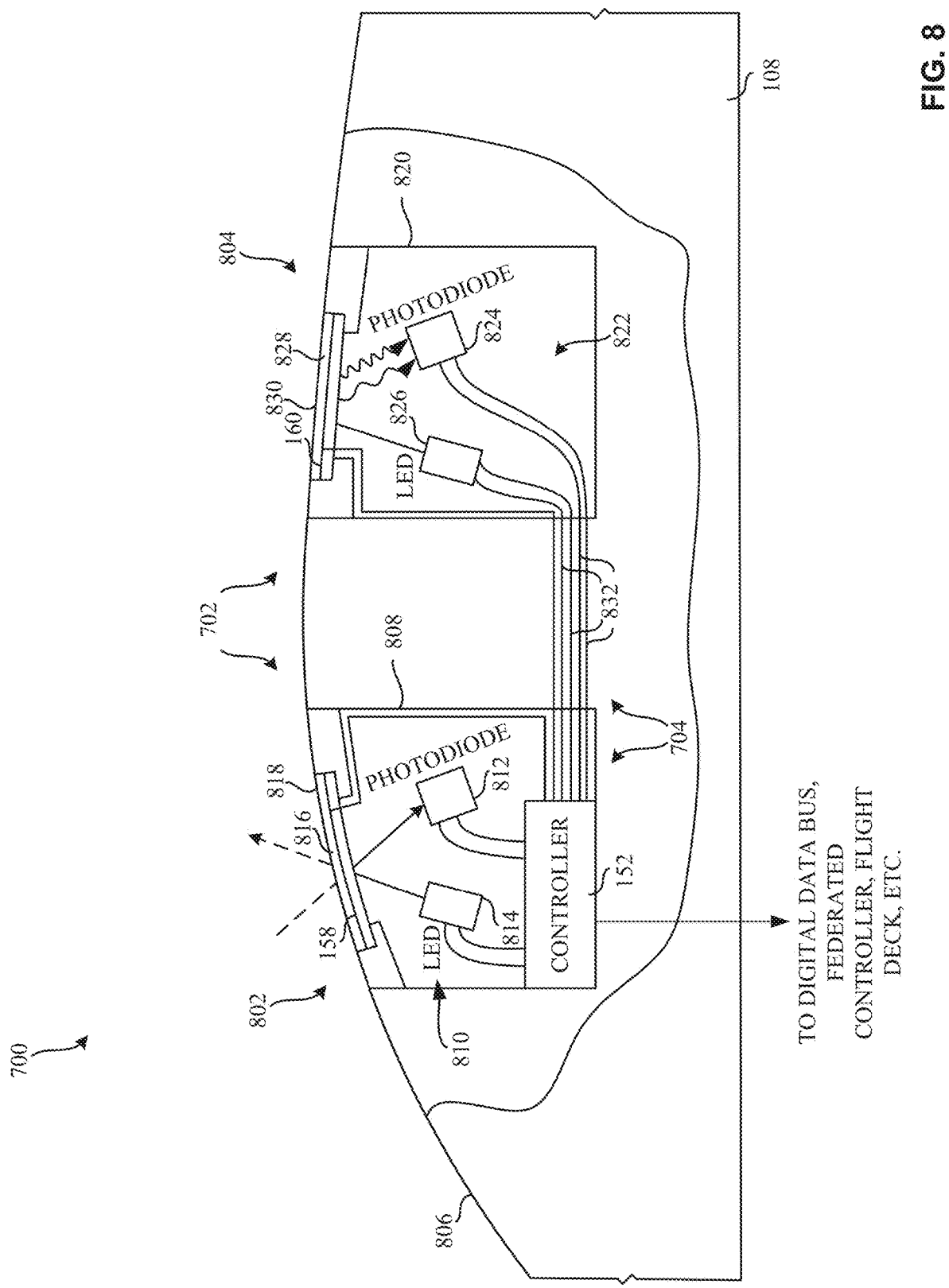
FIG. 8 is a schematic view of the example ice detection system of FIG. 7.

FIG. 8 is a schematic view of the ice detector 702 of FIG. 7. Referring to FIG. 8, The ice detector 702 of the illustrated example is positioned or mounted on the wing 108 of the aircraft 100. Specifically, the ice detector 702 of the illustrated example includes a thermochromic device 802 and a hydrochromic device 804. The thermochromic device 802 and the hydrochromic device 804 of the illustrated example are modules that are installed or positioned inside the wing 108. For example, thermochromic device 802 and the hydrochromic device 804 can be modules that drop into a cut-out or opening formed in the wing 108. Additionally, the thermochromic device 802 and the hydrochromic device 804 of the illustrated example are flush mounted relative to an upper surface 806 of the wing 108. In other words, the thermochromic device 802 and the hydrochromic device 804 of the illustrated example form a portion of the airfoil surface and/or an aerodynamic surface of the wing 108.

The thermochromic device 802 includes a housing 808 to house a first optical sensor 810. The first optical sensor 810 of the illustrated example includes a photodiode 812 and a first light emitting diode (LED) 814. A first cover 816 encloses the first optical sensor 810 in the housing 808. The first cover 816 of the illustrated example is composed of glass (and/or any other (e.g., heat-resistant) transparent or clear material(s)) and includes a thermochromic material (e.g. a substance or layer) on an outer surface 818 of the first cover 816. The outer surface 818 of the first cover 816 is flush with the upper surface 806 of the wing 108. To detect a color (e.g., of the thermochromic material) of the first cover 816, the first LED 814 of the illustrated example directs light toward the first cover 816 and the photodiode 812 receives light that is reflected from the first cover 816. The photodiode 812 communicates a first output signal level (e.g., a voltage or current) representative of the first cover 816 having a first color or communicates a second output signal level (e.g., a voltage or current) representative of the first cover 816 having a second color to the electronic controller 152. The first optical sensor 810 is communicatively coupled to the electronic controller 152 via wires 832.

The hydrochromic device 804 includes a housing 820 to house a second optical sensor 822. The second optical sensor 822 of the illustrated example includes a photodiode 824 and a second light emitting diode (LED) 826. A second cover 828 encloses the second optical sensor 822 in the housing 820. The second cover 828 of the illustrated example is composed of glass (and/or any other (e.g., heat-resistant) transparent or clear material(s)) and includes a hydrochromic material (e.g. a substance or layer) on an outer surface 830 of the second cover 828. The outer surface 830 of the second cover 828 is flush with the upper surface 806 of the wing 108. To detect a color (e.g., of the hydrochromic material) of the second cover 828, the second LED 826 of the illustrated example directs light toward the second cover 828 and the photodiode 824 receives light that is reflected from the second cover 828. The photodiode 824 communicates a first output signal level (e.g., a voltage or current) representative of the second cover 828 having a third color or communicates a second output signal level (e.g., a voltage or current) representative of the second cover 828 having a fourth color to the electronic controller 152. The second optical sensor 822 is communicatively coupled to the electronic controller 152 via wires 832.

In the illustrated example, the photodiodes 812 and 824 are positioned directly adjacent (e.g., beneath) the first cover 816 and the second cover 828, respectively. Thus, no additional hardware or probes (e.g., the rods of FIG. 2 or the airfoil of FIG. 3) are used. Such configuration enables the thermochromic device 802 and the hydrochromic device 804 to be positioned or installed directly on a critical surface (e.g., the leading edge 116 of the wing 108) of the aircraft 100 where ice accretion is likely to occur without affecting (e.g., altering) an aerodynamic characteristic or performance of the critical surface. Additionally, the ice detection system 700 of the illustrated example can be coupled to a surface of the aircraft 100 that is located away from (e.g., a distance greater than four inches from) the fuselage 104. Additionally, the first cover 816 of the illustrated example is heated via the first heater 158 after the electronic controller 152 detects an icing condition to reset or return the thermochromic material of the first cover 816 to a standby mode (e.g., to a temperature greater than the temperature threshold). The second cover 828 of the illustrated example is heated via the second heater 160 to prevent ice formation on the second cover 828 during operation.

Figure 9:
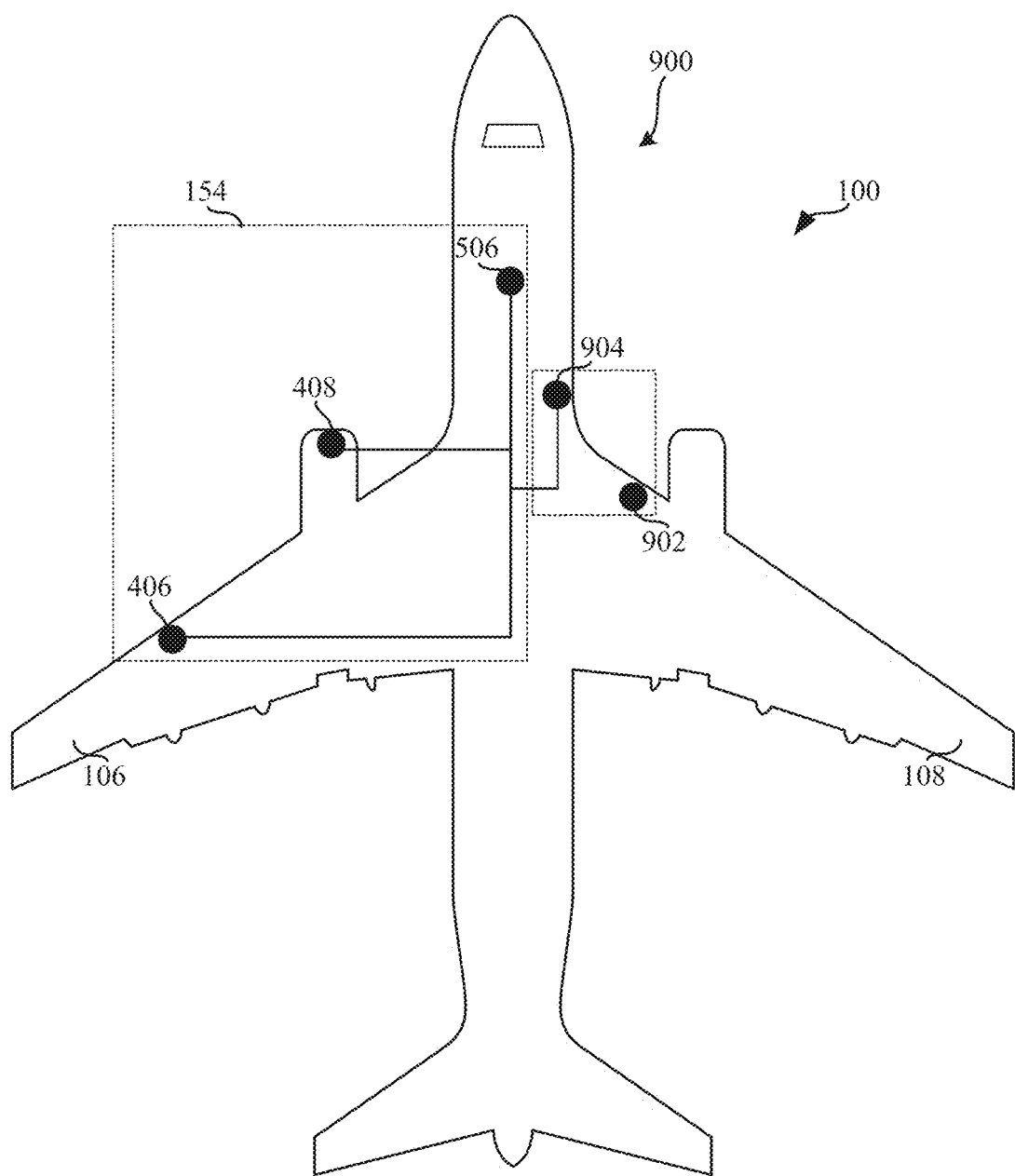
FIG. 9 is yet another example ice detection system disclosed herein.

FIG. 9 is another example ice detection system 900 disclosed herein that can implement the example ice detection system 102 of FIG. 1. The ice detection system 900 of the illustrated example includes an ice detector 902 that can implement the ice detector 140 of FIG. 1 and a control system 904 that can implement the control system 146 of FIG. 1. The ice detector 902 is located on the wing 108 of the aircraft 100 and the control system 904 is located on the fuselage 104. The ice detection system 900 of the illustrated example is communicatively and/or operatively coupled to the federated controller 506. In response to detecting an icing condition, the ice detection system 900 of the illustrated example activates the anti-icing system 154 (e.g., the wing anti-icing system 406, the engine anti-icing system 408, and/or any other anti-icing or icing protection system(s) of the aircraft 100).

Figure 10:
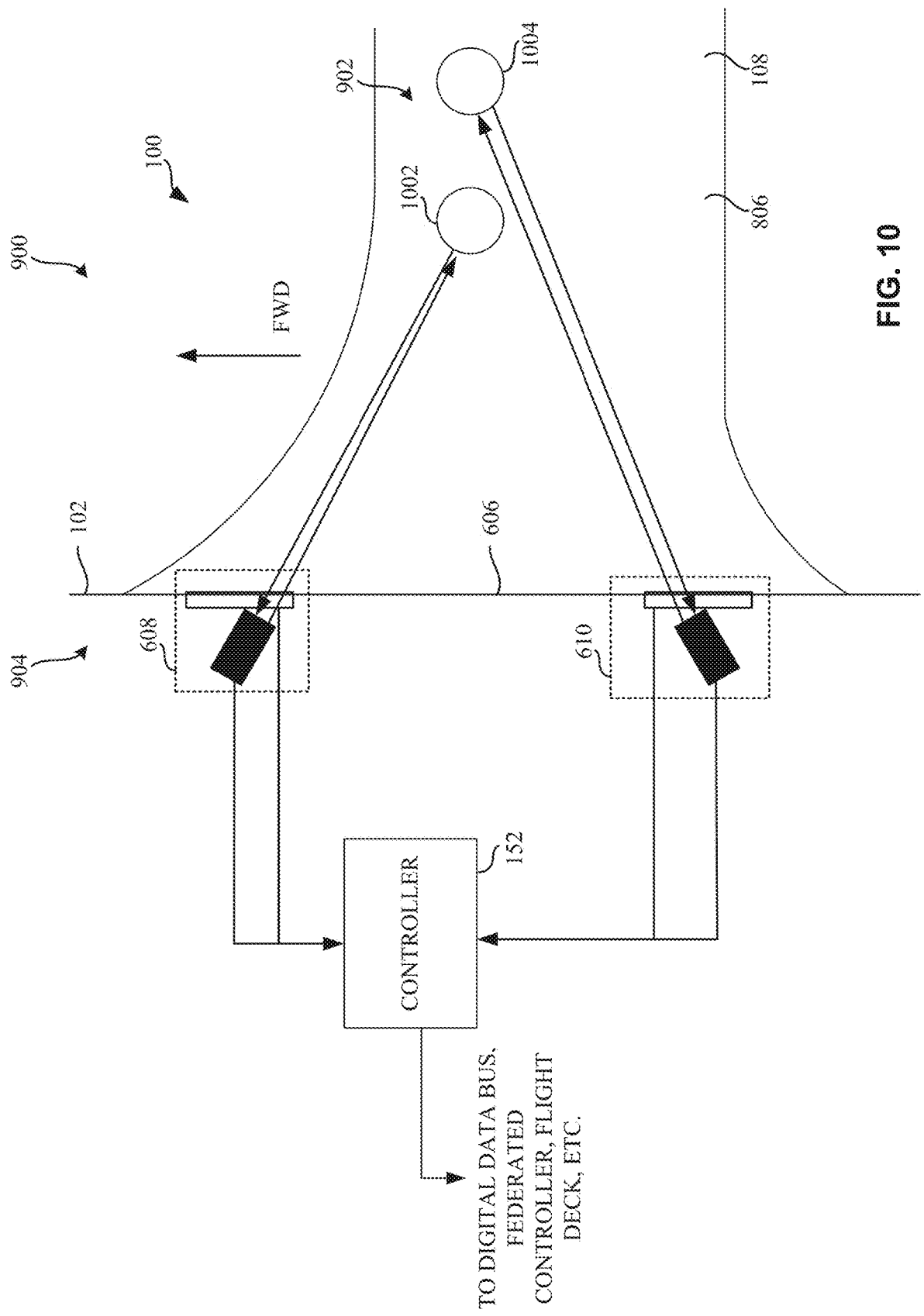
FIG. 10 is a schematic view of the example ice detection system of FIG. 9.

FIG. 10 is a plan, schematic view of the aircraft 100 of FIG. 9. Referring to FIG. 10, the ice detector 902 of the illustrated example is positioned or mounted on the upper surface 806 (e.g., an outermost surface) of the wing 108 of the aircraft 100. Specifically, the ice detector 902 of the illustrated example includes a thermochromic device 1002 and a hydrochromic device 1004. The thermochromic device 1002 and the hydrochromic device 1004 of the illustrated example are disk shaped sensors that are installed or positioned on the wing 108. Specifically, the thermochromic device 1002 and the hydrochromic device 1004 can be disk-shaped sensors that are installed into a cut-out or opening formed in the upper surface 806 of the wing 108. For example, each of the thermochromic device 1002 and the hydrochromic device 1004 can have a diameter of between approximately 1 inch and 5 inches (e.g., 2 inches) and could, for example, be separated laterally (e.g., horizontally) by a distance of approximately between 3 inches and 6 inches (e.g., 4 inches). In some examples, the thermochromic device 1002 and the hydrochromic device 1004 are formed by painting the disk-shaped sensors on the upper surface 806 of the wing 108. Additionally, the thermochromic device 1002 and the hydrochromic device 1004 of the illustrated example are flush mounted relative to the upper surface 806 of the wing 108. In other words, the thermochromic device 1002 and the hydrochromic device 1004 of the illustrated example form a portion of an airfoil surface and/or an aerodynamic surface (e.g., the upper surface 806) of the wing 108.

The control system 904 of the illustrated example is substantially similar to the control system 504 of FIGS. 5 and 6. The control system 904 of the illustrated example includes the first optical sensor 608 that is oriented toward (e.g. projects toward) the thermochromic device 1002 to detect a color characteristic of the thermochromic device 1002 and the second optical sensor 610 that is oriented toward (e.g. projects toward) the hydrochromic device 1004 to detect a color characteristic of the hydrochromic device 1004. In the illustrated example, the first and second optical sensors 608 and 610 are flush mounted with the fuselage 104 and are communicatively coupled to the electronic controller 152. Thus, in the example of FIGS. 9 and 10, both the ice detector 902 and the control system 904 are flush mounted relative to outer surfaces (e.g., the fuselage surface 606 and the upper surface 806) of the aircraft 100.

The foregoing examples of the ice detection systems 102, 400, 500, 700 and 900 can be employed with an aircraft. Although each of the example ice detection systems disclosed above have certain features, it should be understood that it is not necessary for a particular feature of one example to be used exclusively with that example. Instead, any of the features described above and/or depicted in the drawings can be combined with any of the examples, in addition to or in substitution for any of the other features of those examples. Features of one example are not mutually exclusive to features of another example. Instead, the scope of this disclosure encompasses any combination of any of the features. In some examples, an ice detection system disclosed in accordance with the teachings of this disclosure may have a combination of the ice detection systems 102, 400, 500, 700 and 900 disclosed herein. Additionally, an aircraft can have one of more of the ice detection systems 102, 400, 500, 700 and 900 disclosed herein.

Figure 11:
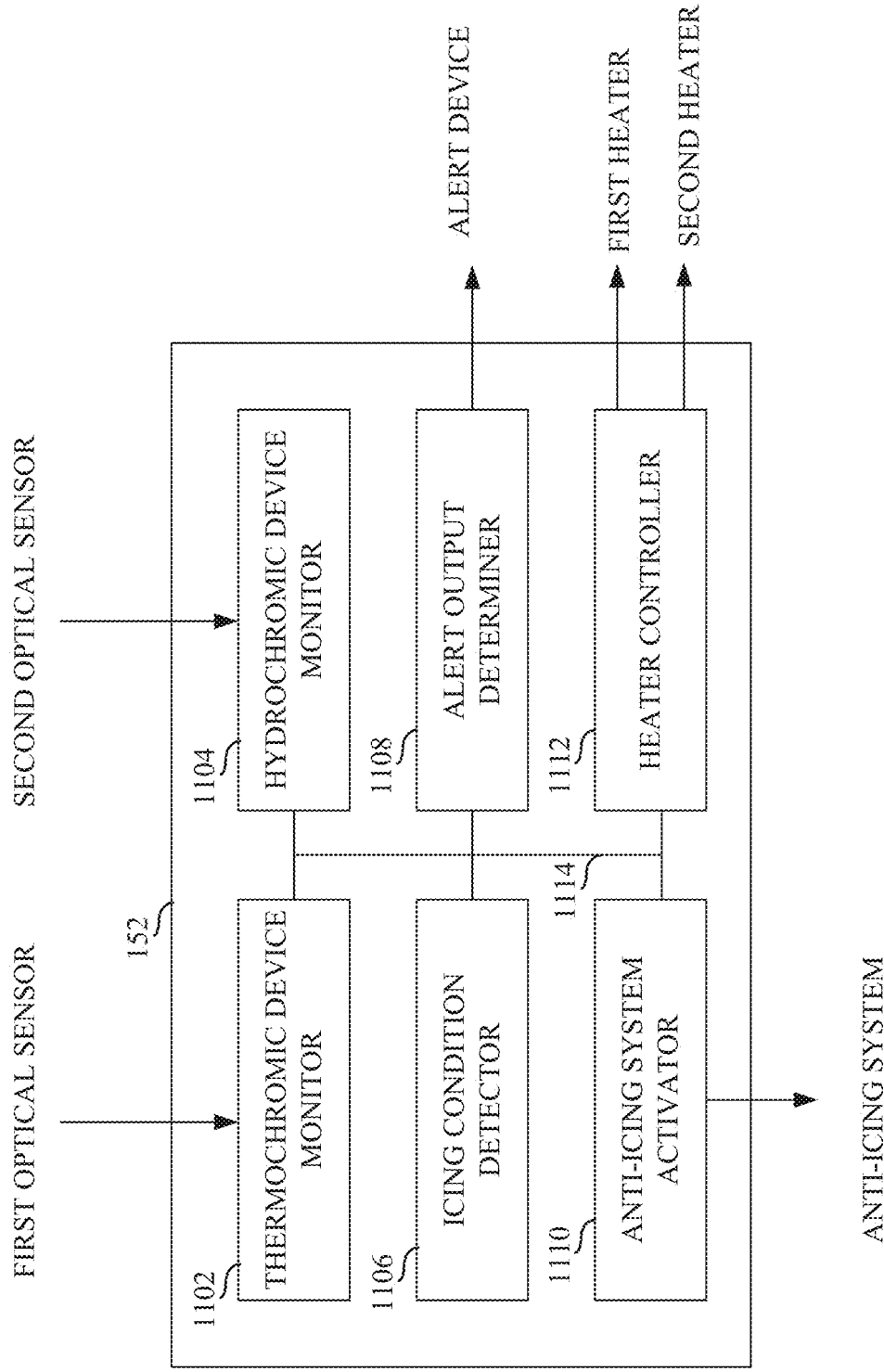
FIG. 11 is a schematic illustration of an example electronic controller that can be used to implement the example ice detection systems disclosed herein.

FIG. 11 is schematic illustration of the electronic controller 152 of FIGS. 1, 6, 8 and 10. The electronic controller 152 of the illustrated example includes an example thermochromic device monitor 1102, an example hydrochromic device monitor 1104, an example icing condition detector 1106, an example alert output determiner 1108, an example anti-icing system activator 1110, and an example heater controller 1112. In some examples, the example thermochromic device monitor 1102, the example hydrochromic device monitor 1104, the example icing condition detector 1106, the example alert output determiner 1108, the example anti-icing system activator 1110, and the example heater controller 1112 are in communication via a communication bus 1114.

The example thermochromic device monitor 1102 of the illustrated example monitors or detects a color (e.g., a change in color) of the thermochromic device 142, 202, 302, 602, 802, 1002. To monitor or detect a (e.g., change in) color of the thermochromic device 142, 202, 302, 602, 802, 1002, the thermochromic device monitor 1102 of the illustrated example is communicatively coupled to the first optical sensor 148, 608. For example, the thermochromic device monitor 1102 of the illustrated example receives a first output signal from the first optical sensor 148, 608 representative of the thermochromic device 142, 202, 302, 602, 802, 1002 having a first color (e.g., a blue color) or receives a second output signal from the first optical sensor 148, 608 representative of the thermochromic device 142, 202, 302, 602, 802, 1002 having a second color (e.g., a white color) different than the first color. For example, the first output signal and/or the first color can be indicative of a temperature (e.g., of freestream air) exceeding (e.g., being greater than) a temperature threshold, and the second output signal and/or the second color can be indicative of a temperature not exceeding (e.g., being less than or equal to) a temperature threshold. In some examples, the first output signal is a logic "1" signal (e.g., a temperature exceeding a temperature threshold) and the second output signal is a logic "0" signal (e.g., a temperature not exceeding the temperature threshold). In some examples, the first optical sensor 148, 608 can provide a first analog output signal (e.g., a voltage between 0 volts and 1 volts, etc.) representative of the thermochromic device 142, 202, 302, 602, 802, 1002 having the first color and a second analog signal (e.g., a voltage between 2 volts and 5 volts, etc.) representative of the thermochromic device 142, 202, 302, 602, 802, 1002 having the second color. In some examples, the electronic controller 152 can include an analog to digital (A/D) converter to convert the analog signals to digital signals for processing by the icing condition detector 1106, the alert output determiner 1108 and/or, more generally, the electronic controller 152.

The example hydrochromic device monitor 1104 of the illustrated example monitors or detects a (e.g., change in) color of the hydrochromic device 144, 204, 304, 604, 804, 1004. To monitor or detect a (e.g., change in) color of the hydrochromic device 144, 204, 304, 604, 804, 1004, the hydrochromic device monitor 1104 of the illustrated example is communicatively coupled to the second optical sensor 150, 610. For example, the hydrochromic device monitor 1104 of the illustrated example receives a first output signal (e.g., a third signal) from the second optical sensor 150, 610 representative of the hydrochromic device 144, 204, 304, 604, 804, 1004 having a first color (e.g., a third color, a gray color, etc.) or receives a second output signal (e.g., a fourth signal) from the second optical sensor 150, 610 representative of the hydrochromic device 144, 204, 304, 604, 804, 1004 having a second color (e.g., a fourth color, a white color, etc.) different than the first color. For example, the first output signal and/or the first color can be indicative of water or moisture accumulation not exceeding (e.g., being less than) a moisture threshold, and the second output signal and/or the second color can be indicative of water or moisture accumulation exceeding (e.g., being greater than or equal to) a moisture threshold. In some examples, the first output signal is a logic "0" signal (e.g., a moisture level not exceeding the moisture threshold) and the second output signal is a logic "1" signal (e.g., a moisture level exceeding the moisture threshold). In some examples, the first and second output signals from the second optical sensor 150, 610 can be analog signals. For example, the second optical sensor 150, 610 can provide a first analog output signal (e.g., a voltage between 0 volts and 1 volts, etc.) representative of the hydrochromic device 144, 204, 304, 604, 804, 1004 having the first color and a second analog signal (e.g., a voltage between 2 volts and 5 volts, etc.) representative of the hydrochromic device 144, 204, 304, 604, 804, 1004 having the second color. In some examples, the electronic controller 152 can include an analog to digital (A/D) converter to convert the analog signals to digital signals for processing by the icing condition detector 1106, the alert output determiner 1108 and/or more generally, the electronic controller 152.

The icing condition detector 1106 is communicatively coupled to the thermochromic device monitor 1102 and hydrochromic device monitor 1104. The icing condition detector 1106 of the illustrated example determines whether icing conditions exist based on the output signals received by the thermochromic device monitor 1102 and the hydrochromic device monitor 1104 from the respective first optical sensor 148, 608 and the second optical sensor 150, 610. For example, the icing condition detector 1106 compares (e.g., via an AND gate) the output signals received by the thermochromic device monitor 1102 and the hydrochromic device monitor 1104 to determine if icing condition is present. In some examples, the icing condition detector 1106 is an AND logic gate.

The icing condition detector 1106 of the illustrated example detects an icing condition in response to the thermochromic device monitor 1102 detecting the second output signal from the first optical sensor 148, 608 (e.g., representative of the temperature being less than or equal to the temperature threshold (e.g., 32° F.)) and the hydrochromic device monitor 1104 detecting the second signal from the second optical sensor 150, 610 (e.g., representative of the moisture being greater than or equal to the moisture threshold). Thus, the icing condition detector 1106 of the illustrated example detects an icing condition in response to both the thermochromic device monitor 1102 detecting that a temperature is less than or equal to a temperature threshold and a moisture level being greater than or equal to a moisture threshold.

The icing condition detector 1106 of the illustrated example detects that an icing condition does not exist in response to at least one of the thermochromic device monitor 1102 receiving the first output signal from the first optical sensor 148, 608 indicative of the temperature being greater than the threshold temperature or the hydrochromic device monitor 1104 receiving the first output signal from the second optical sensor 150, 610 indicative of the moisture level being less than or equal to the moisture threshold. Additionally, the icing condition detector 1106 of the illustrated example detects that an icing condition does not exist in response to the thermochromic device monitor 1102 receiving the second output signal from the first optical sensor 148, 608 indicative of the temperature being less than or equal to the threshold temperature and the hydrochromic device monitor 1104 receiving the first signal from the second optical sensor 150, 610 indicative of the moisture level being less than or equal to the moisture threshold.

The icing condition detector 1106 of the illustrated example outputs a first signal (e.g., a logic signal "1", a voltage between 2 and 5 volts, etc.) in response to detecting an icing condition or a second signal (e.g. a logic signal "0", a voltage between 0 and 1 volt, etc.) different from the first signal in response to detecting a non-icing condition. The icing condition detector 1106 communicates the first signal or the second signal to at least one of the anti-icing system activator 1110, the alert output determiner 1108 and/or the heater controller 1112.

The anti-icing system activator 1110 of the illustrated example receives either the first signal (e.g., a first signal output level) or the second signal (e.g., a second signal output level) from the icing condition detector 1106. In response to the receiving the first signal (e.g., representative of an icing condition) from the icing condition detector 1106, the anti-icing system activator 1110 causes or commands an icing protective system (e.g., the anti-icing system 154) to activate. In response to the receiving the second signal (e.g., representative of a non-icing condition) from the icing condition detector 1106, the anti-icing system activator 1110 causes or commands an icing protective system to deactivate. For example, the anti-icing system activator 1110 can be communicatively coupled to the anti-icing system 154 of the aircraft 100. In some examples, the anti-icing system activator 1110 is implemented via the icing condition detector 1106.

The alert output determiner 1108 of the illustrated example receives either the first signal (e.g., a first signal output level) or the second signal (e.g., a second signal output level) from the icing condition detector 1106. In response to the receiving the first signal (e.g., representative of an icing condition) from the icing condition detector 1106, the alert output determiner 1108 causes or commands an alert device 156 to activate (e.g., to turn on an alarm). In response to the receiving the second signal (e.g., representative of a non-icing condition) from the icing condition detector 1106, the alert output determiner 1108 causes or commands the alert device 156 to deactivate (e.g. turn off or stop emitting an alert). For example, the alert output determiner 1108 can be communicatively coupled to the alert device 156. In some examples, the alert output determiner 1108 is implemented via the icing condition detector 1106.

The heater controller 1112 of the illustrated example receives either the first signal (e.g., a first signal output level) or the second signal (e.g., a first signal output level) from the icing condition detector 1106. In response to the receiving the first signal (e.g., representative of an icing condition) from the icing condition detector 1106, the heater controller causes or commands the first heater 158 associated with the thermochromic device 142, 202, 302, 602, 802, 1002 to activate. In response to the receiving the second signal (e.g., representative of a non-icing condition) from icing condition detector 1106, the heater controller 1112 causes or commands the first heater 158 associated with the thermochromic device 142, 202, 302, 602, 802, 1002 to deactivate (e.g., turn off). In some examples, the heater controller 1112 commands the second heater 160 associated with the hydrochromic device 144, 204, 304, 604, 804, 1004 to activate when the ice detection system 102, 500, 700, 900 is activated. In some examples, the heater controller 1112 determiner is implemented via the icing condition detector 1106.

In some examples, the electronic controller 152 determines whether to persist and/or otherwise continue monitoring for ice conditions via the ice detection system 102, 500, 700, 900. For example, the electronic controller 152 may determine to discontinue monitoring the ice detection system 102, 500, 700, 900 based on a user input, receiving continuing communication (e.g., a communication heartbeat signal, sensor information, etc.) from a sensor communicatively coupled to the ice detection system 102, 500, 700, 900, etc.

While an example manner of implementing the electronic controller 152 of FIGS. 1, 6, 8, and 10 is illustrated in FIG. 11, one or more of the elements, processes and/or devices illustrated in FIG. 11 can be combined, divided, re-arranged, omitted, eliminated and/or implemented in any other way. Further, the example thermochromic device monitor 1102, the example hydrochromic device monitor 1104, the example icing condition detector 1106, the example anti-icing system activator 1108, the example alert output determiner 1110, the example heater controller 1112 and/or, more generally, the example electronic controller 152 of FIG. 1 can be implemented by hardware, software, firmware and/or any combination of hardware, software and/or firmware. Thus, for example, any of the example thermochromic device monitor 1102, the example hydrochromic device monitor 1104, the example icing condition detector 1106, the example anti-icing system activator 1108, the example alert output determiner 1110, the example heater controller 1112 and/or, more generally, the example electronic controller 152 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example thermochromic device monitor 1102, the example hydrochromic device monitor 1104, the example icing condition detector 1106, the example anti-icing system activator 1108, the example alert output determiner 1110, the example heater controller 1112 is/are hereby expressly defined to include a non-transitory computer readable storage device or storage disk such as a memory, a digital versatile disk (DVD), a compact disk (CD), a Blu-ray disk, etc. including the software and/or firmware. Further still, the example electronic controller 152 of FIGS. 1, 6, 8, and 10 can include one or more elements, processes and/or devices in addition to, or instead of, those illustrated in FIG. 11, and/or can include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

The electronic controller 152 may be implemented using one or more of the processing platforms (e.g., the processing platform 1300 of FIG. 13), one or more of the logic circuits (e.g., the control circuit 1400 of FIG. 14), and/or a combination thereof.

Figure 12:
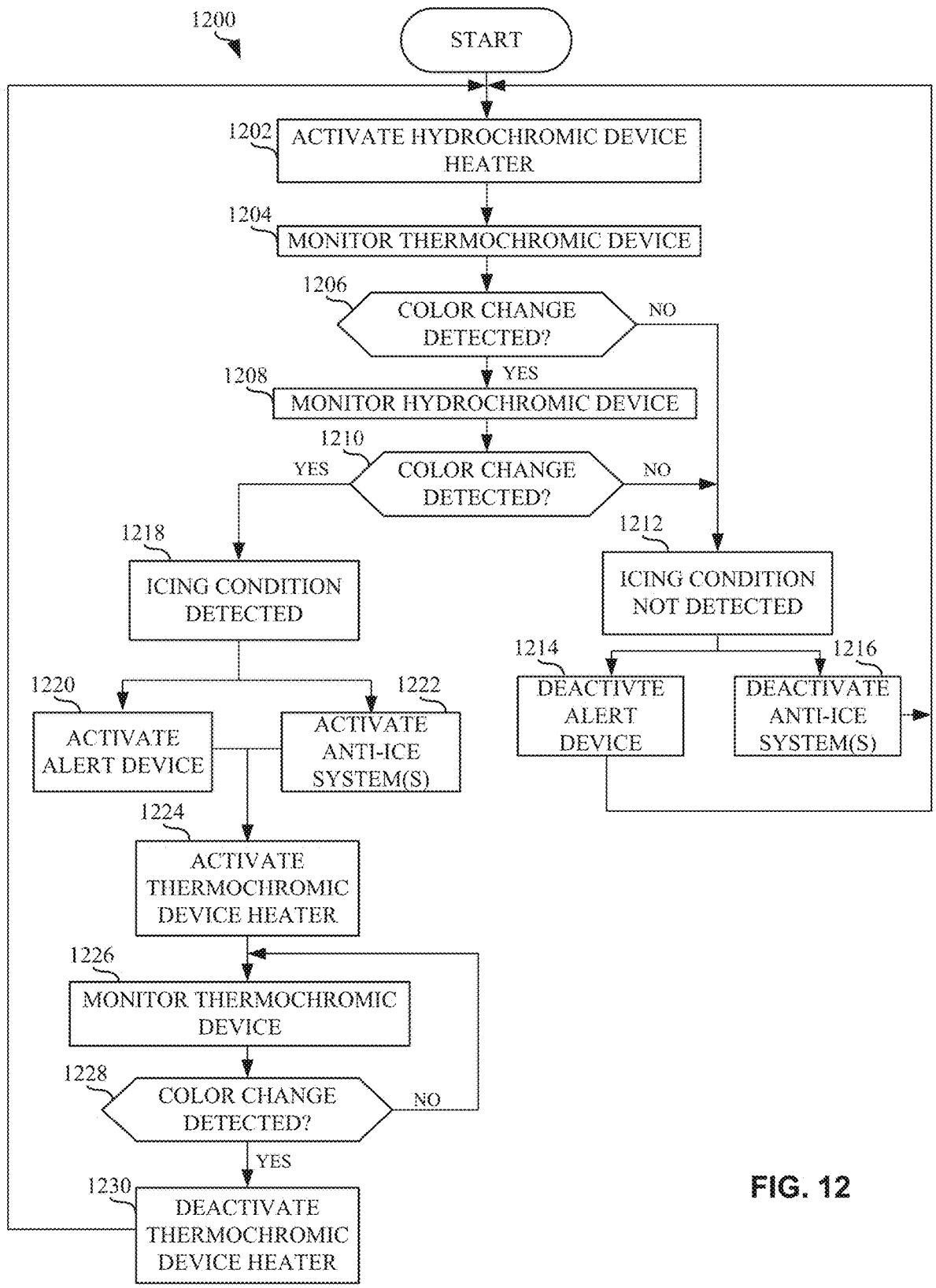
FIG. 12 is a flowchart representative of an example method that can be performed by the example electronic controller of FIG. 11.

A flowchart representative of example hardware logic, machine readable instructions, hardware implemented state machines, and/or any combination thereof for implementing the electronic controller 152 of FIG. 11 is shown in FIG. 12. The machine readable instructions can be an executable program or portion of an executable program for execution by a computer processor such as the processor 1312 shown in the example processor platform 1300 discussed below in connection with FIG. 13. The program can be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowchart illustrated in FIG. 12, many other methods of implementing the electronic controller 152 can alternatively be used. For example, the order of execution of the blocks can be changed, and/or some of the blocks described can be changed, eliminated, or combined. Additionally or alternatively, any or all of the blocks can be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example process of FIG. 12 can be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. can be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

The method of FIG. 12 begins when the electronic controller 152 activates the hydrochromic device heater (block 1202). For example, the heater controller 1112 of the electronic controller 152 provides a signal to the second heater 160 to cause the second heater 160 to activate to provide heat to the hydrochromic device 144, 204, 304, 604, 804, 1004.

The electronic controller 152 monitors the thermochromic device 142, 202, 302, 602, 802, 1002 to detect a color change of the thermochromic device 142, 202, 302, 602, 802, 1002 (block 1204). For example, to monitor the thermochromic device 142, 202, 302, 602, 802, 1002, the thermochromic device monitor 1102 receives a first signal (e.g., a first signal output level) from the first optical sensor 148, 608 indicative of the thermochromic device 142, 202, 302, 602, 802, 1002 having a first color or a second signal (e.g., a second signal output level) from the first optical sensor 148, 608 indicative of the thermochromic device 142, 202, 302, 602, 802, 1002 having a second color.

The electronic controller 152 detects a color change of the thermochromic device 142, 202, 302, 602, 802, 1002 (block 1206). For example, the electronic controller 152 determines that a color change did not occur (e.g., the thermochromic device 142, 202, 302, 602, 802, 1002 has the first color) when the thermochromic device monitor 1102 receives the first output signal (e.g., a first signal output level) from the first optical sensor 148, 608. In contrast, the electronic controller 152 determines that a color change of the thermochromic device 142, 202, 302, 602, 802, 1002 has occurred (e.g., the thermochromic device 142, 202, 302, 602, 802, 1002 has the second color) when the thermochromic device monitor 1102 receives the second output signal (e.g., a second signal output level) from the first optical sensor 148, 608. If at block 1206 the electronic controller 152 does not detect a color change of the thermochromic device 142, 202, 302, 602, 802, 1002 (e.g., the thermochromic device 142, 202, 302, 602, 802, 1002 has the first color), the process 1200 returns to block 1204.

The electronic controller 152 also monitors the hydrochromic device 144, 204, 304, 604, 804, 1004 to detect a color change of the hydrochromic device 144, 204, 304, 604, 804, 1004 (block 1208). For example, to monitor the hydrochromic device 144, 204, 304, 604, 804, 1004, the hydrochromic device monitor 1104 receives a first signal (e.g., a first signal output level) from the second optical sensor 150, 610 indicative of the hydrochromic device 144, 204, 304, 604, 804, 1004 having a first color or a second signal (e.g., a second signal output level) from the second optical sensor

150, 610 indicative of the hydrochromic device 144, 204, 304, 604, 804, 1004 having a second color.

The electronic controller 152 detects a color change of the hydrochromic device 144, 204, 304, 604, 804, 1004 (block 1210). For example, the electronic controller 152 does not detect a color change (e.g., when the hydrochromic device 144, 204, 304, 604, 804, 1004 has the first color) when the hydrochromic device monitor 1104 receives the first output signal (e.g., a first signal output level) from the second optical sensor 150, 610. The electronic controller 152 determines a color change of the hydrochromic device 144, 204, 304, 604, 804, 1004 (e.g., the hydrochromic device 144, 204, 304, 604, 804, 1004 has the second color) when the hydrochromic device monitor 1104 receives the second output signal (e.g., a second signal output level) from the second optical sensor 150, 610.

If at block 1206 the electronic controller 152 does not detect a color change of the thermochromic device 142, 202, 302, 602, 802, 1002 (e.g., the thermochromic device 142, 202, 302, 602, 802, 1002 has the first color) and/or if at block 1210 the electronic controller 152 does not detect a color change of the hydrochromic device 144, 204, 304, 604, 804, 1004 (e.g., the hydrochromic device 144, 204, 304, 604, 804, 1004 has the first color), the electronic controller 152 determines that an icing condition is not detected (block 1212). The electronic controller 152 deactivates the alert device 156 (block 1214) and/or deactivates the anti-ice system 154 (block 1216).

If at block 1206 the electronic controller 152 detects a color change of the thermochromic device 142, 202, 302, 602, 802, 1002 and if at block 1210 the electronic controller 152 detects a color change of the hydrochromic device 144, 204, 304, 604, 804, 1004, the electronic controller 152 detects an icing condition (block 1218). In response, the electronic controller 152 activates the alert device 156 (block 1220) and activates the anti-icing system 154 (block 1222).

Additionally, when an icing condition is detected, the electronic controller 152 activates a thermochromic device heater to restore the thermochromic device 142, 202, 302, 602, 802, 1002 to the primary or initial color (block 1224). For example, the heater controller 1112 provides a signal to activate (e.g., turn on) the first heater 158 associated with the thermochromic device 142, 202, 302, 602, 802, 1002. After the thermochromic device heater is activated, the electronic controller 152 monitors the thermochromic device 142, 202, 302, 602, 802, 1002 to detect a color change of the thermochromic device 142, 202, 302, 602, 802, 1002 (block 1226) (e.g., a first color of the thermochromic device 142, 202, 302, 602, 802, 1002). If the electronic controller 152 does not detect a color change of the thermochromic device 142, 202, 302, 602, 802, 1002 (e.g., the thermochromic device 142, 202, 302, 602, 802, 1002 has the second color) (block 1228), the process returns to block 1226. If at block 1226 the electronic controller 152 detects a color change of the thermochromic device 142, 202, 302, 602, 802, 1002 (e.g., the thermochromic device 142, 202, 302, 602, 802, 1002 has the first color), the electronic controller 152 deactivates the thermochromic device heater (block 1230). For example the heater controller 1112 sends a signal to deactivate (e.g., turn off) the first heater 158.

Figure 13:
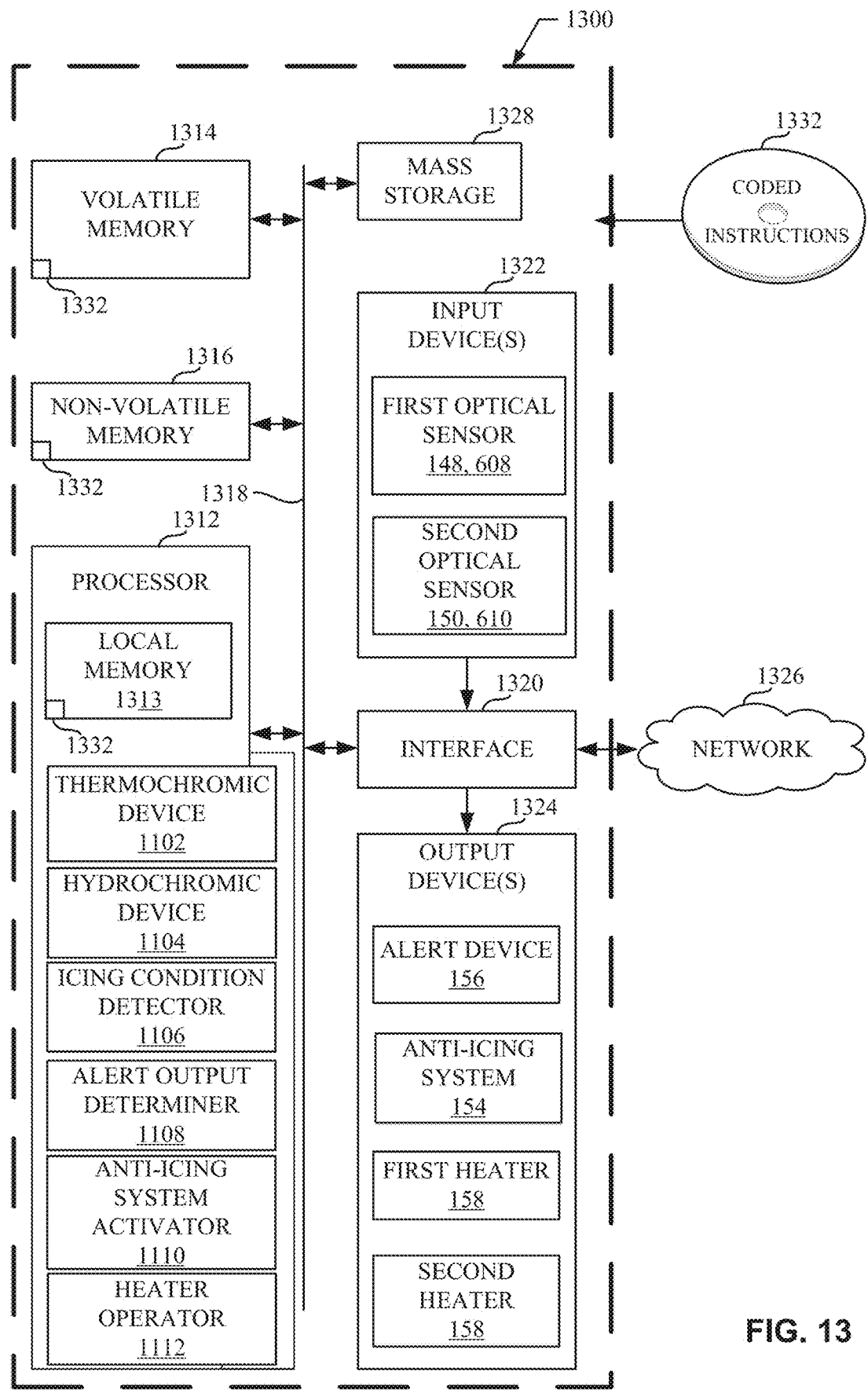
FIG. 13 illustrates an example processor platform structured to execute instructions of FIG. 12 to implement the example electronic controller of FIG. 11.

FIG. 13 is a block diagram of an example processor platform 1300 structured to execute the instructions of FIG. 12 to implement the electronic controller 152 of FIG. 11. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor can be a semiconductor based (e.g., silicon based) device. In this example, the processor implements the example thermochromic device monitor 1102, the example hydrochromic device monitor 1104, the example icing condition detector 1106, the example alert output determiner 1108, the example anti-icing system activator 1110 and the example heater controller 1112.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 can be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 can be implemented by flash memory and/or any other desired type of memory device. Access to the main memory 1314, 1316 is controlled by a memory controller.

The processor platform 1300 of the illustrated example also includes an interface circuit 1320. The interface circuit 1320 can be implemented by any type of interface standard, such as an Ethernet interface, a universal serial bus (USB), a Bluetooth® interface, a near field communication (NFC) interface, an ARINC 429 bus or other ARINC bus, and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system. In some examples, the input devices 1322 include the first optical sensor 148, 608 and the second optical sensor 150, 610.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, and/or speaker. The interface circuit 1320 of the illustrated example, thus, typically includes a graphics driver card, a graphics driver chip and/or a graphics driver processor. In some examples, the output devices 1324 include the alert device 156, the first heater 158, the second heater 160 and the anti-icing system 154.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives.

The machine executable instructions 1332 of FIG. 12 can be stored in the mass storage device 1328, in the volatile memory 1314, in the non-volatile memory 1316, and/or on a removable non-transitory computer readable storage medium such as a CD or DVD.

Figure 14:
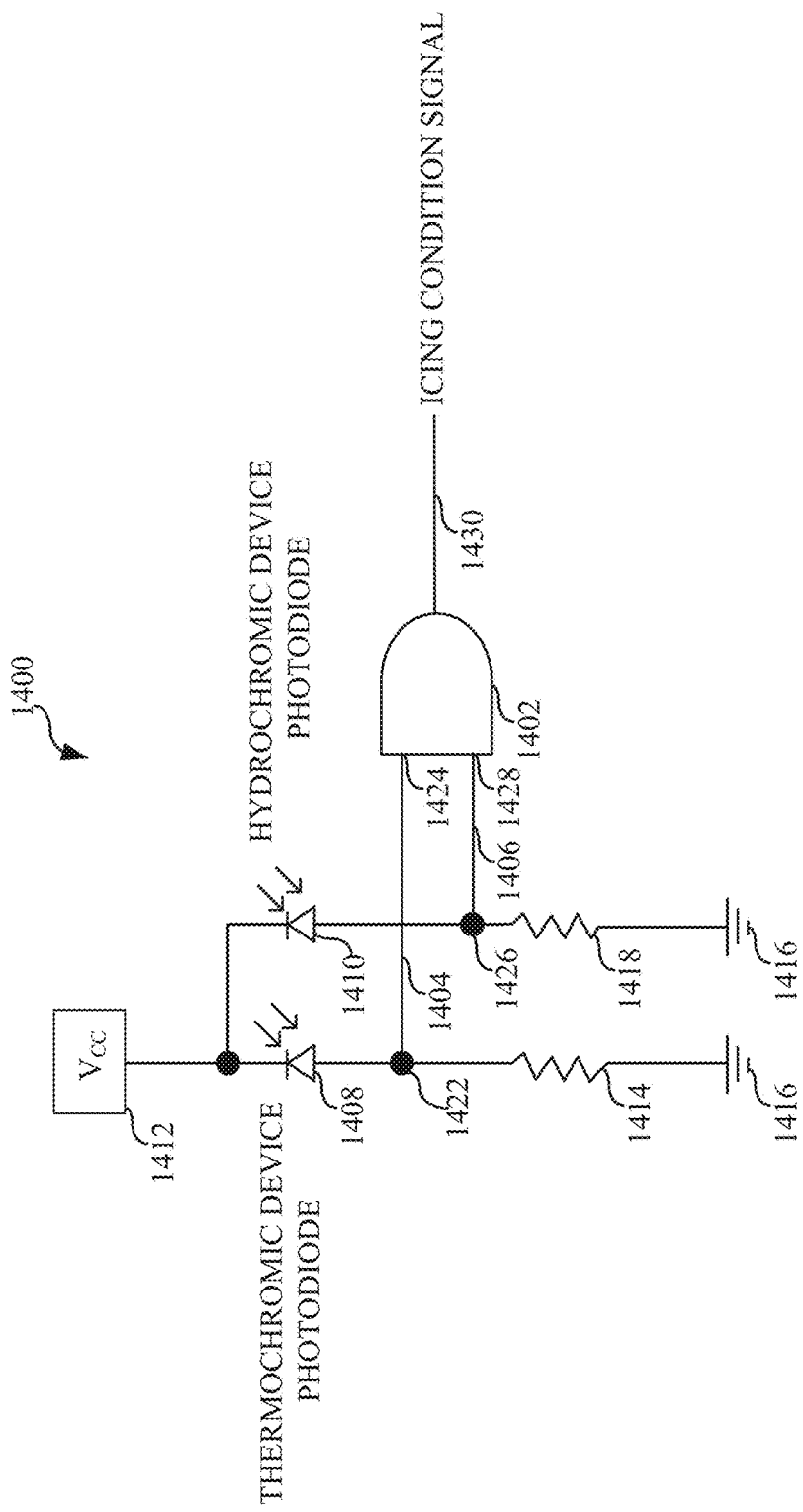
FIG. 14 is a schematic illustration of an example control circuit that can implement the example electronic controller of FIG. 11.

FIG. 14 is a schematic illustration of an example control circuit 1400 that can implement the electronic controller 152 of FIG. 11. The control circuit 1400 of the illustrated example includes an AND gate 1402 (e.g., an AND operator) that receives input signals 1404, 1406 from the respective first optical sensor 1408 and the second optical sensor 1410. Specifically, the power source 160 (e.g., from the aircraft 100) provides a voltage 1412 (e.g., 5 volts) to the first optical sensor 1408 and the second optical sensor 1410. A first resistor 1414 (e.g., a pull down resistor) couples the first optical sensor 1408 to a ground 1416 and a second resistor 1418 (e.g., a pull down resistor) couples the second optical sensor 1410 to the ground 1416.

In operation, when the first optical sensor 1408 (e.g., a first switch, the first optical sensor 148, 608, a photodiode, etc.) senses a first wavelength (e.g., a first color) of a thermochromic device (e.g., the thermochromic device 142, 202, 302, 602, 802, 1002), the first optical sensor 1408 prevents or restricts electrical current flow to a first node 1422. In turn, the first gate 1424 of the AND gate 1402 does not sense the voltage 1412. In some such examples, the voltage sensed by the first gate 1424 is negligible (e.g., between 0 volts and 1 volt). When the first optical sensor 1408 senses a second wavelength (e.g., a second color) of the thermochromic device 142, 202, 302, 602, 802, 1002, the first optical sensor 1408 allows electrical current to pass through the first optical sensor 1408 to the first node 1422, which is received or sensed by the first gate 1424 of the AND gate 1402. In some such examples, the first gate 1424 of the AND gate 1402 receives or senses the logic level high voltage 1412 (e.g., 5 volts).

Likewise, when the second optical sensor 1410 (e.g., a second switch, the second optical sensor 150, 610, a photodiode, etc.) senses a first wavelength (e.g., a first color) of a hydrochromic device (e.g., the hydrochromic device 144, 204, 304, 604, 804, 1004), the second optical sensor 1410 prevents electrical current flow to a second node 1426. In turn, a second gate 1428 of the AND gate 1402 does not receive or sense the voltage 1412. In some such examples, the voltage sensed by the second gate 1428 is negligible (e.g., between 0 volts and 1 volt). When the second optical sensor 1410 senses a second wavelength (e.g., a second color) of the hydrochromic device 144, 204, 304, 604, 804, 1004, the second optical sensor 1410 allows electrical current to pass through the second optical sensor 1410 to the second node 1426, which is received or sensed by the second gate 1428 of the AND gate 1402. In some such examples, the second gate 1428 of the AND gate 1402 receives or senses the voltage 1412 (e.g., 5 volts). When both the first gate 1424 and the second gate 1428 sense the logic level high voltage 1412 (e.g., 5 volts), the AND gate 1402 detects an icing condition and generates an icing condition signal 1430 (e.g., the voltage 1412).

The control circuit 1400 of the illustrated example can be implemented using for example any logic gate corresponding to a truth table based on inputs from the first and second optical sensors 1408 and 1410 and an output (e.g., the icing condition signal 1430) for detecting an icing condition. For example, using truth table conversion methods such as generating and analyzing Karnaugh maps, performing Boolean algebra, etc., an example Boolean expression can be generated to represent a relationships in a truth table representative of inputs from the first optical sensor 1408 and the second optical sensor 1410 and outputs corresponding to a detected icing condition or a non-icing condition. In the illustrated example of FIG. 14, the control circuit 1400 is implemented by the AND gate 1402. The AND gate 1402 of the illustrated example represents a Boolean operator that generates an output (e.g., an icing condition detected) based on the inputs from the first optical sensor 1408 and the second optical sensor 1410. However, in other examples, a control circuit can be represented by other Boolean operators (e.g., NOT AND gates, etc.).

Example 1 includes an ice detection system including a thermochromic device to sense a temperature of freestream air relative to a temperature threshold, and a hydrochromic device to sense an amount of moisture in the freestream air relative to a moisture threshold. A controller detects an icing condition in response to the thermochromic device sensing a temperature that is less than or equal to the temperature threshold and the hydrochromic device sensing an amount moisture that exceeds the moisture threshold.

Example 2 includes the system of Example 1, where the controller receives at least one of a first output signal or a second output signal from the thermochromic device, and at least one of a third output signal or a fourth output signal from the hydrochromic device.

Example 3 includes the system of any one of Examples 1-2, where the thermochromic device is configured to have a first color in response to sensing a temperature that exceeds the temperature threshold and a second color distinguishable from the first color in response to sensing a temperature that does not exceed temperature threshold.

Example 4 includes the system of any one of Examples 1-3, where the hydrochromic device is configured to have a third color in response to sensing an amount of moisture that does not exceed the moisture threshold and a fourth color distinguishable from the third color in response to sensing an amount of moisture that exceeds the moisture threshold.

Example 5 includes the system of any one of Examples 1-4, where the thermochromic device includes a first optical sensor configured to distinguish between the first color and the second color, and the hydrochromic device includes a second optical sensor configured to distinguish between the third color and the fourth color.

Example 6 includes the system of any one of Examples 1-5, where the first optical sensor is to provide the first output signal in response to detecting the first color and the second output signal in response to detecting the second color, and the second optical sensor is to provide the third output signal in response to detecting the third color and the fourth output signal in response to detecting the fourth color.

Example 7 includes the system of any one of Examples 1-6, where the thermochromic device includes a first portion of a critical surface of an aircraft coated with a thermochromic material, and a second portion of the critical surface coated with a hydrochromic material.

Example 8 includes the system of any one of Examples 1-7, where at least one of the hydrochromic device or the thermochromic device has an airfoil shape.

Example 9 includes the system of any one of Examples 1-8, where the thermochromic device is a first probe coated with a thermochromic material, and the hydrochromic device is a second probe coated with a hydrochromic material.

Example 10 includes the system of any one of Examples 1-9, where the controller is to cause activation of an anti-icing system of an aircraft in response to detecting the icing condition.

Example 11 includes a method for detecting an icing condition including identifying a first color or a second color of a thermochromic device, the first color corresponding to an air temperature being greater than a temperature threshold and the second color corresponding to the air temperature being less than or equal to the temperature threshold; identifying a third color or a fourth color of a hydrochromic device, the third color corresponding to an amount of moisture not exceeding a moisture threshold and the fourth color corresponding to an amount of moisture exceeding the moisture threshold; and determining an icing condition in response to identifying the second color and the fourth color.

Example 12 includes the method of Example 11, further including activating an anti-icing system in response to detecting the icing condition.

Example 13 includes the method of any one of Examples 11-12, further including receiving at least one of a first signal output or a second signal output from a first photodiode associated with the thermochromic device, the first signal output being representative of the thermochromic device having the first color, the second signal output being representative of the thermochromic device having the second color.

Example 14 includes the method of any one of Examples 11-13, further including receiving at least one of a third signal output or a fourth signal output from a second photodiode associated with the hydrochromic device, the third output signal being representative of the hydrochromic device having the third color and the fourth signal output being representative of the hydrochromic device having the fourth color.

Example 15 includes the method of any one of Examples 11-14, further including further including determining that a non-icing condition exists in response to identifying the thermochromic device having the first color or the hydrochromic device having the third color.

Example 16 includes a non-tangible, computer-readable medium comprising instructions that when executed cause a machine to: identify a first color or a second color of a thermochromic device, the first color corresponding to an air temperature being greater than a temperature threshold and the second color corresponding to the air temperature being less than or equal to the temperature threshold; identifying a third color or a fourth color of a hydrochromic device, the third color corresponding to an amount of moisture not exceeding a moisture threshold and the fourth color corresponding to an amount of moisture exceeding the moisture threshold; and determine an icing condition in response to identifying the second color and the fourth color.

Example 17 includes the computer-readable medium of Example 16, further including instructions that, when executed, cause the machine to receive a first signal output from a first photodiode associated with the thermochromic device being representative of the thermochromic device having the first color or a second signal output from the first photodiode being representative of the thermochromic device having the second color.

Example 18 includes the computer-readable medium of any one of Examples 16-17, further including instructions that, when executed, cause the machine to receive a third signal output from a second photodiode associated with the hydrochromic device being representative of the hydrochromic device having the third color or a fourth signal output from the second photodiode being representative of the thermochromic device having the fourth color.

Example 19 includes the computer-readable medium of any one of Examples 16-18, further including instructions that, when executed, cause the machine to activate an anti-icing system in response to detecting the icing condition.

Example 20 includes the computer-readable medium of any one of Examples 16-18, further including instructions that, when executed, cause the machine to activate a heater associated with the thermochromic device in response to detecting the icing condition.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An ice detection system for use with an aircraft, the system comprising:
    a thermochromic device to sense a temperature of freestream air relative to a temperature threshold;
    a hydrochromic device to sense an amount of moisture in the freestream air relative to a moisture threshold; and
    a controller to detect an icing condition in response to the thermochromic device sensing a temperature that is less than or equal to the temperature threshold and the hydrochromic device sensing an amount moisture that exceeds the moisture threshold.

2. The system as define in claim 1, wherein the controller receives at least one of a first output signal or a second output signal from the thermochromic device, and at least one of a third output signal or a fourth output signal from the hydrochromic device.

3. The system as defined in claim 2, wherein the thermochromic device is configured to have a first color in response to sensing a temperature that exceeds the temperature threshold and a second color distinguishable from the first color in response to sensing a temperature that does not exceed temperature threshold.

4. The system as defined in claim 3, wherein the hydrochromic device is configured to have a third color in response to sensing an amount of moisture that does not exceed the moisture threshold and a fourth color distinguishable from the third color in response to sensing an amount of moisture that exceeds the moisture threshold.

5. The system as defined in claim 4, wherein the thermochromic device includes a first optical sensor configured to distinguish between the first color and the second color, and the hydrochromic device includes a second optical sensor configured to distinguish between the third color and the fourth color.

6. The system as defined in claim 5, wherein the first optical sensor is to provide the first output signal in response to detecting the first color and the second output signal in response to detecting the second color, and the second optical sensor is to provide the third output signal in response to detecting the third color and the fourth output signal in response to detecting the fourth color.

7. The system as defined in claim 1, wherein the thermochromic device includes a first portion of a critical surface of an aircraft coated with a thermochromic material, and a second portion of the critical surface coated with a hydrochromic material.

8. The system as defined in claim 1, wherein at least one of the hydrochromic device or the thermochromic device has an airfoil shape.

9. The system as defined in claim 1, wherein the thermochromic device is a first probe coated with a thermochromic material, and the hydrochromic device is a second probe coated with a hydrochromic material.

10. The system as defined in claim 9, wherein the controller is to cause activation of an anti-icing system of the aircraft in response to detecting the icing condition.

11. A method for detecting an icing condition for use with an aircraft, the method including:
identifying a first color or a second color of a thermochromic device, the first color corresponding to an air temperature being greater than a temperature threshold and the second color corresponding to the air temperature being less than or equal to the temperature threshold;
identifying a third color or a fourth color of a hydrochromic device, the third color corresponding to an amount of moisture not exceeding a moisture threshold and the fourth color corresponding to an amount of moisture exceeding the moisture threshold; and
determining an icing condition in response to identifying the second color of the thermochromic device and the fourth color of the the hydrochromic device.

12. The method of claim 11, further including activating an anti-icing system in response to detecting the icing condition.

13. The method of claim 11, further including receiving at least one of a first signal output or a second signal output from a first photodiode associated with the thermochromic device, the first signal output being representative of the thermochromic device having the first color, the second signal output being representative of the thermochromic device having the second color.

14. The method of claim 13, further including receiving at least one of a third signal output or a fourth signal output from a second photodiode associated with the hydrochromic device, the third output signal being representative of the hydrochromic device having the third color and the fourth signal output being representative of the hydrochromic device having the fourth color.

15. The method of claim 11, further including determining that a non-icing condition in response to identifying the thermochromic device having the first color or the hydrochromic device having the third color.

16. A tangible, computer-readable medium comprising instructions that, when executed, cause a machine to:
identify a first color or a second color of a thermochromic device, the first color corresponding to an air temperature being greater than a temperature threshold and the second color corresponding to the air temperature being less than or equal to the temperature threshold;
identify a third color or a fourth color of a hydrochromic device, the third color corresponding to an amount of moisture not exceeding a moisture threshold and the fourth color corresponding to an amount of moisture exceeding the moisture threshold; and
determine an icing condition in response to identifying the second color of the thermochromic device and the fourth color of the hydrochromic device.

17. The computer-readable medium as defined in claim 16 further including instructions that, when executed, cause the machine to receive a first signal output from a first photodiode associated with the thermochromic device being representative of the thermochromic device having the first color or a second signal output from the first photodiode being representative of the thermochromic device having the second color.

18. The computer-readable medium as defined in claim 17 further including instructions that, when executed, cause the machine to receive a third signal output from a second photodiode associated with the hydrochromic device being representative of the hydrochromic device having the third color or a fourth signal output from the second photodiode being representative of the thermochromic device having the fourth color.

19. The computer-readable medium as defined in claim 16 further including instructions that, when executed, cause the machine to activate an anti-icing system in response to detecting the icing condition.

20. The computer-readable medium as defined in claim 16 further including instructions that, when executed, cause the machine to activate a heater associated with the thermochromic device in response to detecting the icing condition.

* * * * *